(12) United States Patent
Guo et al.

(10) Patent No.: US 12,108,265 B2
(45) Date of Patent: Oct. 1, 2024

(54) CONTROL INFORMATION PROCESSING

(71) Applicant: ZTE Corporation, Guangdong (CN)

(72) Inventors: Qiujin Guo, Guangdong (CN);
Mengzhu Chen, Guangdong (CN); Jun Xu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 326 days.

(21) Appl. No.: 17/491,329

(22) Filed: Sep. 30, 2021

(65) Prior Publication Data

US 2022/0201516 A1 Jun. 23, 2022

Related U.S. Application Data

(63) Continuation of application No. PCT/CN2019/081003, filed on Apr. 2, 2019.

(51) Int. Cl.
*H04W 24/08* (2009.01)
*H04L 27/26* (2006.01)
*H04W 72/0446* (2023.01)
*H04W 72/0453* (2023.01)
*H04W 72/23* (2023.01)

(52) U.S. Cl.
CPC ....... *H04W 24/08* (2013.01); *H04L 27/26025* (2021.01); *H04W 72/0446* (2013.01); *H04W 72/0453* (2013.01); *H04W 72/23* (2023.01)

(58) Field of Classification Search
CPC ........... H04W 24/08; H04W 27/26025; H04W 72/23; H04W 72/0446; H04W 72/0453

USPC ................ 370/329, 328, 338, 341, 345, 350
See application file for complete search history.

(56) References Cited

U.S. PATENT DOCUMENTS

| 9,078,148 | B2 | 7/2015 | Lee et al. | |
|---|---|---|---|---|
| 11,297,674 | B2 | 4/2022 | He et al. | |
| 11,751,140 | B2 | 9/2023 | Li | |
| 2015/0245227 | A1* | 8/2015 | Patel | H04W 24/04 |
| | | | | 455/434 |
| 2018/0146430 | A1 | 5/2018 | Yadav et al. | |

FOREIGN PATENT DOCUMENTS

| CN | 108696463 A | 10/2018 |
|---|---|---|
| CN | 109429258 A | 3/2019 |
| RU | 2604830 C1 | 12/2016 |
| WO | 2019015460 A1 | 1/2019 |

OTHER PUBLICATIONS

WO 2018030803 A1 Ryu Hyunseok Method and Apparatus for Transmitting and Receiving Downlink Control Information in a Wireless Communication System Feb. 15, 2018.*
Wen Pingping WO 2015173645 A1 DRX Coordination Mechanism in Dual Connectivity System Nov. 19, 2015.*

(Continued)

*Primary Examiner* — Nghi H Ly
(74) *Attorney, Agent, or Firm* — Perkins Coie LLP

(57) ABSTRACT

Techniques are described to select, by a user equipment, a monitoring mode for a control channel based on an information received by the user equipment. The UE may select the monitoring mode from a plurality of monitoring modes for one or more control channels. Furthermore, the UE monitors the control channel according to the monitoring mode.

20 Claims, 14 Drawing Sheets

(56) References Cited

OTHER PUBLICATIONS

European Search Report for EP Patent Application No. 19923412.1, dated Oct. 17, 2022, 8 pages.
Catt, "PDCCH skipping and switching of PDCCH monitoring periodicity," 3GPP TSG RAN WG2 #105bis, R2-1903126, Xi'an, China, Apr. 8-12, 2019, 5 pages.
Oppo, "UE Adaptation to the Traffic and UE Power Consumption," 3GPP TSG RAN WG1 #96, R1-1902745, Athens, Greece, Feb. 25-Mar. 1, 2019, 14 pages.
3GPP TS 38.331 V17.2.0 (Sep. 2022), Technical Specification, "3rd Generation Partnership Project; Technical Specification Group Radio Access Network; NR; Radio Resource Control (RRC) protocol specification (Release 17)," 1290 pages.
3GPP TS 38.213 V17.2.0 (Jun. 2022), Technical Specification, "3rd Generation Partnership Project; Technical Specification Group Radio Access Network; NR; Physical layer procedures for control (Release 17)," 256 pages.
3GPP TS 38.300 V17.2.0 (Sep. 2022), Technical Specification, "3rd Generation Partnership Project; Technical Specification Group Radio Access Network; NR; NR and NG-RAN Overall Description; Stage 2 (Release 17)," 210 pages.
3GPP TS 38.306 V17.2.0 (Sep. 2022), Technical Specification, "3rd Generation Partnership Project; Technical Specification Group Radio Access Network; NR; User Equipment (UE) radio access capabilities (Release 17)," 244 pages.
ZTE, "Extension to Rel-16 DCI-based power saving adaptation during DRX Active Time," 3GPP TSG RAN WG1 #103-e, R1-2007974, e-Meeting, Oct. 26-Nov. 13, 2020, 7 pages.
ZTE et al., "Extension to Rel-16 DCI-based power saving adaptation during DRX Active Time," 3GPP TSG RAN WG1 #104-e, R1-2100526, e-Meeting, Jan. 25-Feb. 5, 2021, 9 pages.
3GPP TS 38.213 V17.0.0 (Dec. 2021), Technical Specification, "3rd Generation Partnership Project; Technical Specification Group Radio Access Network; NR; Physical layer procedures for control (Release 17)," 225 pages.
3GPP TS 38.331 V17.0.0 (Mar. 2022), Technical Specification, "3rd Generation Partnership Project; Technical Specification Group Radio Access Network; NR; Radio Resource Control (RRC) protocol specification (Release 17)," 1214 pages.
3GPP TS 38.300 V17.1.0 (Jun. 2022), Technical Specification, "3rd Generation Partnership Project; Technical Specification Group Radio Access Network; NR; NR and NG-RAN Overall Description; Stage 2 (Release 17)," 209 pages.
3GPP TS 38.306 V17.1.0 (Jun. 2022), Technical Specification, "3rd Generation Partnership Project; Technical Specification Group Radio Access Network; NR; User Equipment (UE) radio access capabilities (Release 17)," 221 pages.
Qualcomm Incorporated, "DL signals and channels for NR-U," 3GPP TSG RAN WG1 Meeting #93, R1-1807387, Busan, Korea, May 21-25, 2018, 10 pages.
3GPP TR 38.840 V1.0.0 (Mar. 2019), Technical Report, "3rd Generation Partnership Project; Technical Specification Group Radio Access Network; NR; Study on UE Power Saving (Release 16)," 70 pages.
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15), 474 pages.
Chinese office action issued in CN Patent Application No. 201980095225.0, dated Jun. 17, 2022, 10 pages. English translation included.
Chinese Notification to Complete Formalities of Registration issued in CN Patent Application No. 201980095225.0, dated Sep. 5, 2022, 4 pages. English translation included.
Russian Decision to Grant and Search Report issued in RU Patent Application No. 2021131893, dated Aug. 8, 2022, 19 pages. English translation included.
International Preliminary Report on Patentability issued in International Patent Application No. PCT/CN2019/081003, dated Sep. 28, 2021, 4 pages. English translation included.
Ericsson, "On DL signals and channels for NR-U," 3GPP TSG-RAN WG1 Meeting #94, Goteborg, Sweden, R1-1809202, 6 pages, Aug. 20-24, 2018.
Huawei et al., "Design of power saving signal," 3GPP TSG RAN WG1 Meeting #95, Spokane, USA, R1-1812232, 5 pages, Nov. 12-16, 2018.
International Search Report and Written Opinion mailed on Dec. 27, 2019 for International Application No. PCT/CN2019/081003, filed on Apr. 2, 2019 (7 pages).
Oppo, "Ue adaptation to the traffic for UE power saving," 3GPP TSG RAN WG1 Meeting #94bis, Chengdu, China, R1-1810976, 8 pages, Oct. 8-12, 2018.
Panasonic, "DL signals and channels for NR-U," 3GPP TSG-RAN WG1 #96bis, Xi'an, China, R1-1904166, 5 pages, Apr. 8-12, 2019.

* cited by examiner

CONTROL INFORMATION PROCESSING

CROSS-REFERENCE TO RELATED APPLICATIONS

This application is a continuation of International Patent Application No. PCT/CN2019/081003, filed on Apr. 2, 2019, the contents of which are incorporated herein by reference in their entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for monitoring the physical downlink control channel (PDCCH) to save power. An exemplary wireless communication method includes selecting, by a user equipment, a monitoring mode for a control channel based on an information received by the user equipment, where the monitoring mode is selected from a plurality of monitoring modes for one or more control channels; and monitoring the control channel according to the monitoring mode.

In a first implementation of some embodiments, the selected monitoring mode is one of a first monitoring mode that skips control channel monitoring and a second monitoring mode that does not support skipping control channel monitoring. In the first implementation, a first set of parameters of the first monitoring mode include: a starting position when control channel monitoring is skipped, or a duration for skipping control channel monitoring, or a parameter associated with a timer, and a second set of parameters of the second monitoring mode include: a control channel monitoring periodicity, or a starting position offset, or a monitoring duration in a periodicity, or monitoring symbols of a slot in the monitoring duration.

In the first implementation, the starting position is not less than 0 or is a value of null, the duration for skipping control channel monitoring is a number of slot that is not less than 0 or is equal to the multiple of $\alpha$ and $2^n$, where $\alpha$ is an integer that is not less than 0 and n is an integer that is not less than 0 and not larger than 10, the control channel monitoring periodicity is the number of slot that is greater than 0 slot, the starting position offset is less than the control channel monitoring periodicity, and the monitoring duration is the number of slot that is greater than 0 and not larger than the control channel monitoring periodicity, and a starting slot index of the monitoring duration is associated with the control channel monitoring periodicity and the starting position offset.

In a second implementation of some embodiments, the selected monitoring mode is one of a first monitoring mode that reduces a control channel monitoring frequency and a second monitoring mode that does not reduce the control channel monitoring frequency. In the second implementation, a first set of parameters of the first monitoring mode include: a first control channel monitoring periodicity Ks1, or a starting position offset, or a first monitoring duration in a periodicity Ts1, or monitoring symbols of a slot in the first monitoring duration, a second set of parameters of the second monitoring mode include: a second control channel monitoring periodicity Ks2, or the starting position offset, or a second monitoring duration in a periodicity Ts2, or monitoring symbols of a slot in the second monitoring duration, where Ks1>Ks2 or Ts1<Ts2, or where the control channel monitoring frequency is a value obtained by either dividing the first monitoring duration in a periodicity by the first control channel monitoring periodicity or by dividing the second monitoring duration in a periodicity by the second control channel monitoring periodicity.

In the second implementation, the first or second control channel monitoring periodicity is a number of slot that is greater than 0 slot, the starting position offset is less than the first or second control channel monitoring periodicity, the first monitoring duration is the number of slot that is greater than 0 and not larger than the first control channel monitoring periodicity, respectively, the second monitoring duration is the number of slot that is not less than 0 and not larger than the second control channel monitoring periodicity, respectively, and a starting slot index of the first or second monitoring duration is associated with the first or second control channel monitoring periodicity, respectively, and the starting position offset.

In the second implementation, a set of parameters of the first monitoring mode include: a modifying factor $\delta$ of a control channel monitoring frequency, or a control channel monitoring periodicity offset, or a starting position of a modifying control channel monitoring frequency, or a stopped position of the modifying control channel monitoring frequency, or a duration of the modifying control channel monitoring frequency, where the control channel monitoring frequency is a value obtained by dividing a monitoring duration in a periodicity by a control channel monitoring periodicity.

In the second implementation, the modifying factor $\delta$ is $2^n$, where n is not greater than 0, the control channel monitoring periodicity offset is a number of slot that is greater than 0 and is associated with $\delta$, the starting position of the modifying control channel monitoring frequency is associated with the control channel monitoring periodicity offset, the stopped position of the modifying control channel monitoring frequency is associated with the control channel monitoring periodicity offset, and the duration of the modifying control channel monitoring frequency is the number of slot that is greater than 0.

In a third implementation of some embodiments, the selected monitoring mode is a first monitoring mode that skips control channel monitoring mode and a second monitoring mode that reduces a control channel monitoring frequency. In the third implementation, a first set of parameters of the first monitoring mode include: a starting position when control channel monitoring is skipped, or a duration for skipping control channel monitoring, or a parameter associated with a timer, a second set of parameters of the second monitoring mode include: a control channel monitoring periodicity, or a starting position offset, or a monitoring duration in a periodicity, or monitoring symbols of a slot in the monitoring duration, and where the control channel monitoring frequency is a value obtained by dividing the monitoring duration in the periodicity by the control channel monitoring periodicity.

In the third implementation, the starting position is not less than 0 or is a value of null, the duration for skipping control channel monitoring is a number of slot that is not less than 0 or is equal to the multiple of $\alpha$ and $2^n$, where $\alpha$ is an integer that is not less than 0, and n is an integer that is not less than 0 and not larger than 10, the control channel monitoring periodicity is the number of slot that is greater than 0 slot, the starting position offset is less than the control channel monitoring periodicity, the monitoring duration is the number of slot that is greater than 0 and not larger than the control channel monitoring periodicity, and a starting slot index of the monitoring duration is associated with the control channel monitoring periodicity and the starting position offset.

In the third implementation, a set of parameters of the second monitoring mode include: a modifying factor $\delta$ of the control channel monitoring frequency, or a control channel monitoring periodicity offset, or a starting position of a modifying control channel monitoring frequency, or a stopped position of the modifying control channel monitoring frequency, or a duration of the modifying control channel monitoring frequency, and where the control channel monitoring frequency is a value obtained by dividing the monitoring duration in a periodicity by a control channel monitoring periodicity.

In the third implementation, the modifying factor $\delta$ is $2^n$, where n is not greater than 0, the control channel monitoring periodicity offset is a number of slot that is greater than 0 and is associated with $\delta$, the starting position of the modifying control channel monitoring frequency is associated with the control channel monitoring periodicity offset, the stopped position of the modifying control channel monitoring frequency is associated with the control channel monitoring periodicity offset, and the duration of the modifying control channel monitoring frequency is the number of slot that is greater than 0.

In a fourth implementation of some embodiments, the selected monitoring mode is one of a first monitoring mode that reduces a control channel monitoring frequency with a first type of parameters and a second monitoring mode that reduces the control channel monitoring frequency with a second type of parameters. In the fourth implementation, a first set of parameters of the first monitoring mode include: a first control channel monitoring periodicity Ks1, or a starting position offset, or a first monitoring duration in a periodicity Ts1, or monitoring symbols of a slot in the monitoring duration, a second set of parameters of the second monitoring mode include: a second control channel monitoring periodicity Ks2, or the starting position offset, or a second monitoring duration in a periodicity Ts2, or monitoring symbols of a slot in the monitoring duration, and where the control channel monitoring frequency is a value obtained by either dividing the first monitoring duration in a periodicity by the first control channel monitoring periodicity or by dividing the second monitoring duration in a periodicity by the second control channel monitoring periodicity.

In the fourth implementation, the first control channel monitoring periodicity of the first type of parameters is different from the second control channel monitoring periodicity of the second type of parameters, the first monitoring duration is different from the second monitoring duration, and the control channel monitoring frequency for the first monitoring mode different from that of the second monitoring mode, and Ts1/Ks1>Ts2/Ks2, or Ks1<Ks2, or Ts1>Ts2.

In the fourth implementation, the first or second control channel monitoring periodicity is a number of slot that is greater than 0 slot, the starting position offset is less than the control channel monitoring periodicity, the first or second monitoring duration is the number of slot that is not less than 0 and not larger than the control channel monitoring periodicity, and a starting slot index of the first or second monitoring duration is associated with the first or second control channel monitoring periodicity, respectively, and the starting position offset.

In some embodiments, the first set of parameters, the second set of parameters, or the set of parameters are provided by search space information in a radio resource control (RRC) signaling or by medium access control-control element (MAC CE) or by layer 1 (L1) signaling. In some embodiments, the information includes: downlink control information (DCI) format information, or search space type information, or radio network temporary identifier (RNTI), or wake-up signal carrying instructions, or an identifier of the user equipment. In some embodiments, the information includes: a start time and a length of a time domain, or a number of physical resource blocks in a frequency domain, or a bandwidth part index (BWP ID), or a control resource set index (CORESET ID), or a carrier index (carrier ID), or a subcarrier spacing (SCS), or a carrier aggregation level (AL), or a frequency range type (FR type), or a rank indication value (RI), or a number of antenna ports (port), or a precoding codebook index (PMI)

In some embodiments, the information includes a service type, or a power saving policy, or a power saving parameter of a power saving policy. In some embodiments, the information includes: a channel state information reference signal (CSI-RS), or a demodulation reference signal (DMRS), or a hybrid automatic repeat request acknowledgement signal (HARQ-ACK), or a synchronization reference signal (TRS), or a sounding reference signal (SRS). In some embodiments, the information includes: a radio resource control (RRC) layer control signaling or layer 3 signaling, or an intermediate access control layer control information or layer 2 signaling, or a downlink control information (DCI) or layer 1 signaling. In some embodiments, the information indicates control channel monitoring mode of the user equipment or a group of one or more user equipment, and the group of user equipment is grouped by a base station according to one or more parameters related to the group of user equipment.

In some embodiments, the one or more parameters include: a user equipment identifier (UE ID), a radio network temporary identification number (RNTI), a power saving RNTI, or a priority of a service type. In some embodiments, the the control channel is a physical downlink control channel (PDCCH).

In yet another exemplary aspect, the above-described method is embodied in the form of processor-executable code and stored in a computer-readable program medium. Thus, a computer readable program storage medium can have code stored thereon, where the code, when executed by a processor, causes the processor to implement the method described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In the existing long term evolution (LTE) and 5G new radio access technology (NR) communication systems, the user equipment (UE) needs to know the uplink scheduling grant information for sending physical uplink shared channel (PUSCH) and downlink scheduling allocation information for receiving physical downlink shared channel (PDSCH). The information is included in the downlink control information (DCI) and is sent by the base station to the UE on the PDCCH channel in different DCI formats. Therefore, the UE should first monitor the PDCCH.

The operation of the UE to monitor the PDCCH may be performed on the control resource set and the PDCCH monitoring occasions for a search space set. The relevant monitoring parameters of the PDCCH are included in the SearchSpace field of the radio resource control (RRC) signaling, where the searchSpaceId and the controlResourceSetId information elements (IE) indicate the search space set index and CORESET applicable for this SearchSpace for PDCCH monitoring. The searchSpaceType IE in SearchSpace field indicates the search space type of the PDCCH that the UE wants to monitor, that is, the common search space/UE-Specific search space corresponds to different DCI formats to be detected, and the UE-Specific search space contains less DCI formats.

Figure 1A:
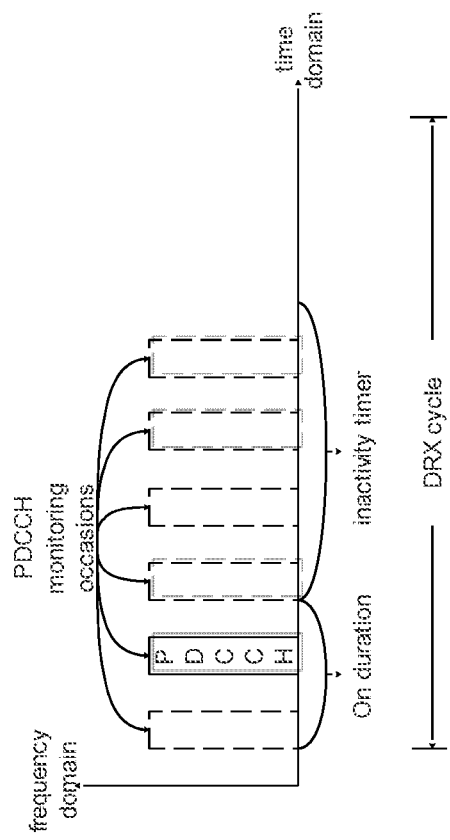
FIG. 1A shows a conventional monitoring technique to monitor PDCCH with discontinuous reception (DRX) configuration.
Figure 1B:
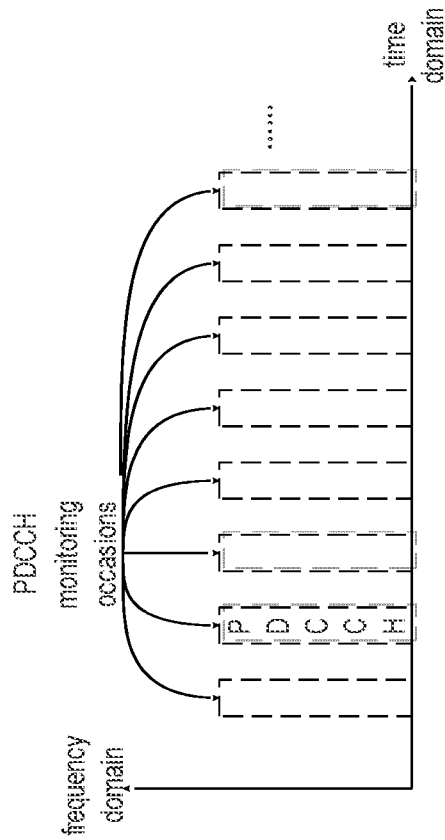
FIG. 1B shows a conventional monitoring technique to monitor PDCCH without DRX configuration.

The duration IE of the RRC signaling is a duration of $T_s < k_s$ indicating the number of slots that the UE monitors PDCCH for search space set s; monitoringSlotPeriodicityAndOffset IE indicates a PDCCH monitoring periodicity of $k_s$ slots and a PDCCH monitoring offset of $o_s$ slots; monitoringSymbolsWithinSlot indicates the first symbol(s) of the CORESET within a slot for PDCCH monitoring. The specific PDCCH monitoring occasion(s) can be obtained as follows. For search space set s, the UE determines that a PDCCH monitoring occasion(s) exists in a slot with number $n_{s,f}^{\mu}$ in a frame with number $n_f$ if $(n_f N_{slot}^{frame,\mu} + n_{s,f}^{\mu} - o_s)$ mod $k_s = 0$. The UE monitors PDCCH for search space set s for $T_s$ consecutive slots, starting from slot $n_{s,f}^{\mu}$, and does not monitor PDCCH for search space set s for the next $k_s - T_s$ consecutive slots. FIGS. 1A and 1B shows an example of the PDCCH monitoring with $T_s = 1$ slot and $k_s = 2$ slots.

This patent document discloses exemplary power saving techniques that can combine skipping PDCCH monitoring behavior and PDCCH periodicity monitoring behavior by switching PDCCH monitoring parameters. Simulation results show that the exemplary power saving techniques can reduce the UE power consumption compared with the PDCCH monitoring method in NR Rel-15.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

INTRODUCTION

In the existing long-term evolution and 5G NR communication system, downlink L1/L2 control information includes downlink scheduling allocation information and uplink scheduling grant information, such as time-frequency resources, and time-slots format, modulation and coding mode, and uplink transmission formats of the information to be received by UE. In 5G NR, there are 8 DCI formats including DCI format 0_0/1_0/0_1/1_1/2_0/2_1/2_2/2_3. DCI format 0_0/1_0 is a fallback format supporting higher reliability and less bearer information bits; DCI format 0_1/1_1 is a non-fallback format carrying more information bits and supporting all NR features indication; DCI format 2_0 indicates the slot format information (SFI) for UE; DCI format 2_1 is used for notifying the PRB(s) and OFDM symbol(s) where UE may assume no transmission is intended for the UE; DCI format 2_2 transmits TPC commands for PUCCH and PUSCH; DCI format 2_3 transmits a group of TPC commands for SRS transmissions by one or more UEs, and a SRS request along with a TPC command. Specifically, the base station or gNodeB (gNB) sends the downlink scheduling information to the UE through the PDCCH, and the UE detects and monitors all available PDCCH candidates in PDCCH occasions for a search space set according to the network configuration by RRC signaling/MAC CE. In NR, the UE does not need to perform PDCCH monitoring on the entire bandwidth, but the number of PDCCH candidates to be monitored by the UE is still large. In some intermittent traffic mode, the interval of two consecutive data arrivals is so long that the UE performs lots of unnecessary PDCCH monitoring operations resulting in lots of power consumption.

This patent document describes techniques for the UE to save power for PDCCH monitoring. As described in the NR Release-15 specification and shown in FIGS. 1A and 1B, the UE performs PDCCH monitoring at the PDCCH monitoring occasions during DRX active time in each DRX cycle with discontinuous reception (DRX) configuration; and the UE monitors PDCCH at the PDCCH monitoring occasions with non DRX configuration. For search space set s, the PDCCH monitoring occasion(s) is calculated by $(n_f N_{slot}^{frame,\mu} + n_{s,f}^{\mu} - o_s) \bmod k_s = 0$, where UE monitors PDCCH for $T_s$ consecutive slots, starting from slot $n_{s,f}^{\mu}$, and does not monitor PDCCH for the next $k_s - T_s$ consecutive slots. $T_s$ is the PDCCH monitoring occasions shown in FIGS. 1A and 1B, namely, $T_s$ slots per PDCCH monitoring periodicity.

Currently, only the power saving mode of the DRX is supported in the NR, however the power consumption of the UE is wasted by performing excessive unnecessary PDCCH monitoring operations. This patent document proposes exemplary PDCCH monitoring modes where the UE selects an appropriate PDCCH monitoring mode or parameter set according to some predefined information. The exemplary monitoring modes can not only reduce unnecessary PDCCH monitoring power consumption, but also avoid missing PDCCH reception and effectively reduce the delay. Thus, the exemplary techniques described in this patent document provide technical benefits of reducing the unnecessary PDCCH monitoring operation and reducing the PDCCH monitoring power consumption of the UE.

An example of a PDCCH monitoring technique includes combining a skipping PDCCH monitoring technique with a PDCCH periodicity monitoring technique. The UE may adjust the PDCCH monitoring behavior according to the base station or network's L1/L2/L3 signaling indication or automatically trigger to reduce unnecessary PDCCH monitoring. After adopting the exemplary PDCCH monitoring scheme, the UE can beneficially reduce unnecessary PDCCH monitoring operations and achieve power saving.

Figure 2:
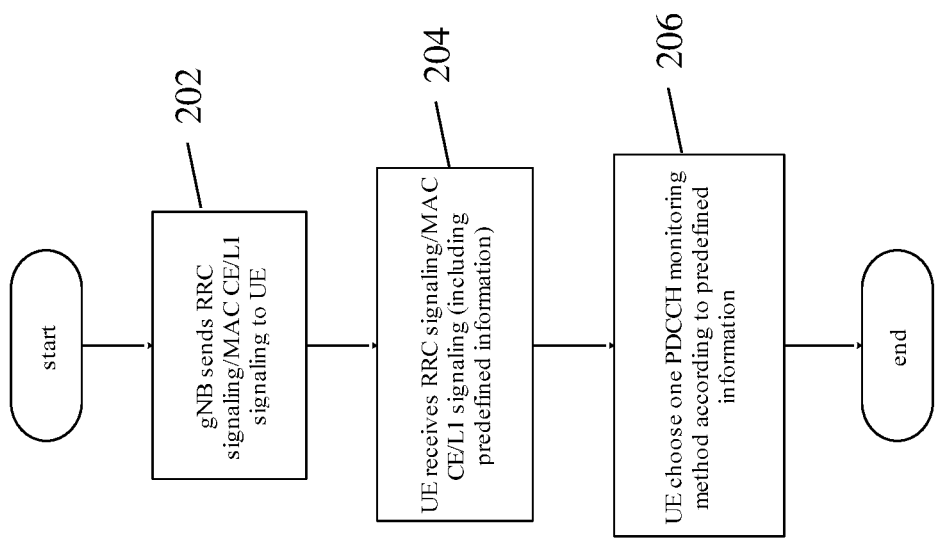
FIG. 2 shows an exemplary power saving technique for PDCCH monitoring.
Figure 3:
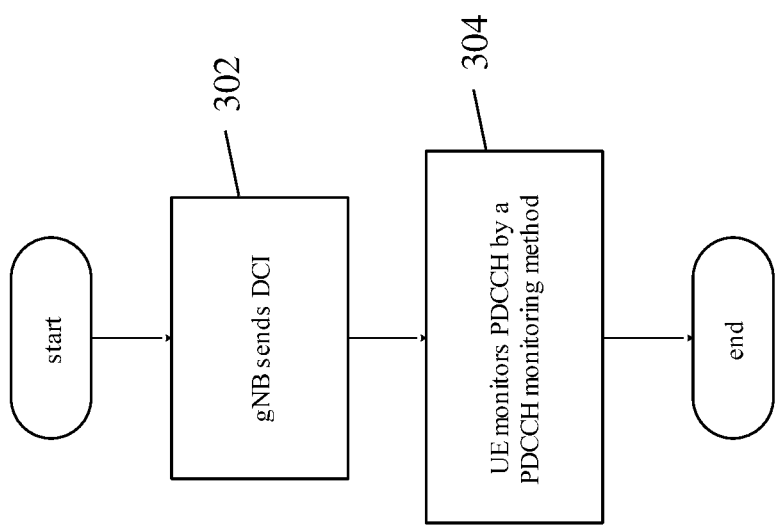
FIG. 3 shows a flow diagram of a base station sending downlink control information (DCI) to a user equipment (UE).

I. Embodiment 1: The UE Determines the PDCCH Monitoring Mode According to the Control Information FIG. 2 shows an exemplary power saving technique for PDCCH monitoring. At operation 202, the gNB sends RRC signaling/MAC CE/L1 signaling to UE. At operation 204, the UE receives the signaling including the predefined information. At operation 206, the UE chooses a PDCCH monitoring method based on the predefined information. Thus, the UE monitors the PDCCH by the current PDCCH monitoring mode. When the control information for the UE is a specific type of control information (e.g., radio network temporary identifier (RNTI)) or when the control information for the UE is different from the current information, the UE may determine an appropriate PDCCH monitoring mode according to the predefined information received by the UE. For example, if the predefined information is RNTI, UE may monitor PDCCH with larger PDCCH frequency only when receiving C-RNTI or MCS-C_RNTI or CS-RNTI, where C-RNTI or MCS-C_RNTI or CS-RNTI are the specific types of control information. As further explained below in Methods 1 to 4 of Embodiment 1, the UE may skip PDCCH monitoring or switch PDCCH periodicity monitoring parameters or perform other operations based on the predefined information received by the UE from the gNB.

Method 1: The Predefined Information is DCI Format

UE knows the next PDCCH carrying DCI format 0_0/1_0 or DCI format 2_0/2_1/2_2/2_3 before PDCCH monitoring or the last monitored PDCCH carrying DCI format 0_0/1_0 or DCI format 2_0/2_1/2_2/2_3. If the current PDCCH monitoring frequency ($T_{s\_curr}/K_{s\_curr}$) for UE is larger than a threshold A (threshold A≥M1), the UE may switch to another PDCCH monitoring mode that achieves a higher PDCCH monitoring frequency by shortening PDCCH monitoring periodicity or increasing PDCCH monitoring duration, where the shortening PDCCH monitoring periodicity means another PDCCH monitoring periodicity ($K_{s\_another}$) is smaller than that a monitoring periodicity ($K_s$) for the UE configured by L1/L2/L3 signaling or the current PDCCH monitoring periodicity ($K_{s\_curr}$) multiples $2^{n1}$, n1<0; and where the increasing PDCCH monitoring duration means another PDCCH monitoring duration ($T_{s\_another}$) is larger than that a monitoring duration ($T_s$) provided to the UE by L1/L2/L3 signaling or the current PDCCH monitoring duration ($T_{s\_curr}$) multiples $2^{n2}$, n2>0. Otherwise, n1 and n2 are equal to 0, where 1/4≤M1≤1.

When the DCI format carried by PDCCH sending for UE by gNB is DCI format 0_1/1_1, and the current PDCCH monitoring frequency ($T_{s\_curr}/K_{s\_curr}$) for UE is larger than a threshold B (threshold B≥M2), the UE may switch to another PDCCH monitoring mode that achieves a smaller PDCCH monitoring frequency by increasing PDCCH monitoring periodicity or shortening PDCCH monitoring duration, where the increasing PDCCH monitoring periodicity means that another PDCCH monitoring periodicity ($K_{s\_another}$) is larger than a monitoring periodicity ($K_s$) for the UE configured by L1/L2/L3 signaling or the current PDCCH monitoring periodicity ($K_{s\_curr}$) multiples $2^{n1}$, n1>0; and where the shortening PDCCH monitoring duration means another PDCCH monitoring duration ($T_{s\_other}$) is smaller than that a monitoring duration ($T_s$) provided to the UE by L1/L2/L3 signaling or the current PDCCH monitoring duration ($T_{s\_curr}$) multiples $2^{n2}$, n2<0. Otherwise, n1 and n2 are equal to 0, where 0<M2≤3/4 and M1≤M2.

In this monitoring mode, since the DCI format 0_0/1_0 is a fallback DCI format, the transmission reliability can be high. Therefore, the PDCCH monitoring should be performed more frequently over a length of time to prevent missed detection. The DCI format 0_1/1_1 needs a better channel condition carrying a larger payload size so that the reliability requirement for DCI format 0_1/1_1 is relatively less strict. For DCI format 0_1/1_1, the PDCCH monitoring period can be appropriately relaxed, so that the PDCCH monitoring is performed less frequently over a length of time.

Method 2: The Predefined Information is a Search Space Type Information

In the case of monitoring PDCCH in a common search space for the UE, if the current PDCCH monitoring frequency ($T_{s\_curr}/K_{s\_curr}$) for UE is larger than a threshold A (threshold A≤M1), the UE may switch to another PDCCH monitoring mode that achieves a higher PDCCH monitoring frequency, otherwise, keeping with the current PDCCH monitoring mode. In the case of monitoring PDCCH in the UE-specific search space for the UE, if the current PDCCH monitoring frequency ($T_{s\_curr}/K_{s\_curr}$) for UE is larger than a threshold B (threshold B≥M2), the UE may switch to another PDCCH monitoring mode that achieves a smaller PDCCH monitoring frequency.

This method considers that for the common search space, the UE has higher reliability requirements for receiving DCI format 0_0/1_0, DCI format 2_0, DCI format 2_1, DCI format 2_2, DCI format 2_3, and therefore, in order to prevent missed DCI reception, the PDCCH monitoring should be performed more frequently over a length of time. Conversely, for the UE-specific search space, the system has relatively low reception reliability requirements for DCI format 0_0/1_0 and DCI format 0_1/1_1. Therefore, the PDCCH monitoring period can be appropriately relaxed so that the timing of monitoring the PDCCH is performed more frequently over a length of time.

Method 3: The Predefined Information is of an RNTI Type Information

When the UE determines or monitors that the PDCCH carrying DCI includes cyclic redundancy check (CRC) scrambled by P-RNTI, or SI-RNTI, or RA-RNTI, and so on, other than the C-RNTI, MCS-C-RNTI, or CS-RNTI, the UE may switch to another PDCCH monitoring mode that achieves a higher PDCCH monitoring frequency, otherwise, keeping with the current PDCCH monitoring mode. In the case of the DCI carried by the PDCCH with CRC scrambled by the C-RNTI, MCS-C-RNTI, or CS-RNTI, and the current PDCCH monitoring frequency ($T_{s\_curr}/K_{s\_curr}$) for UE is larger than a threshold B (threshold B≥M2), the UE may switch to another PDCCH monitoring mode that achieves a smaller PDCCH monitoring frequency.

Method 4: The Predefined Information is Indication Information Carried by the Wake-Up Signal (WUS)

When the UE detects the WUS at the WUS detection occasion, and knows the subsequent data arriving according to the WUS indication by gNB, the UE may adopt a more frequently PDCCH monitoring mode during a length of time, and switch to the original PDCCH monitoring mode after detecting the PDCCH when no other related configurations are received. If the UE does not detect WUS at the WUS detection time, the UE can determine that no data may arrive in the subsequent slots until the next WUS detection occasion or the next DRX On duration and the UE may skip PDCCH monitoring until the ending position of DRX On duration or the next WUS detection occasion.

Methods 3 and 4 under this embodiment can achieve a larger power saving gain by reducing unnecessary PDCCH monitoring.

Method 5: The Predefined Information is Power Saving DCI (PS-DCI) or a PS-RNTI.

If UE detects a PDCCH carrying PS-DCI, UE can be indicated by a PS-DCI carried by PDCCH to perform switching PDCCH monitoring periodicity or skipping PDCCH monitoring. For example, the UE monitors PDCCH with PDCCH monitoring frequency Ks/Ts=1. PS-DCI is transmitted to indicate a PDCCH monitoring periodicity, e.g., 1/8, to UE. Then, the UE can increase its PDCCH monitoring periodicity Ks by multiplying 8 or decrease the duration of PDCCH monitoring Ts in a periodicity by multiplying 1/8.

If UE decodes a PDCCH carrying a DCI with CRC scrambled by PS-RNTI, UE can also adjust the PDCCH monitoring periodicity indicated by a PS-RNTI. The specific PDCCH monitoring mode should be indicated by DCI or MAC CE or RRC signaling.

II. Embodiment 2: The UE Determines the PDCCH Monitoring Mode According to the Information Related to the Resource FIG. 1 shows an exemplary power saving technique for PDCCH monitoring. At operation 202, the gNB sends RRC signaling/MAC CE/L1 signaling to UE. At operation 204, the UE receives the signaling including the predefined information. At operation 206, the UE chooses a PDCCH monitoring method based on the predefined information.

FIG. 2 shows a flow diagram of a base station sending DCI to a UE. At operation 302, the gNB sends DCI to UE. At operation 304, the UE monitors PDCCH by a PDCCH monitoring method.

Figure 4:
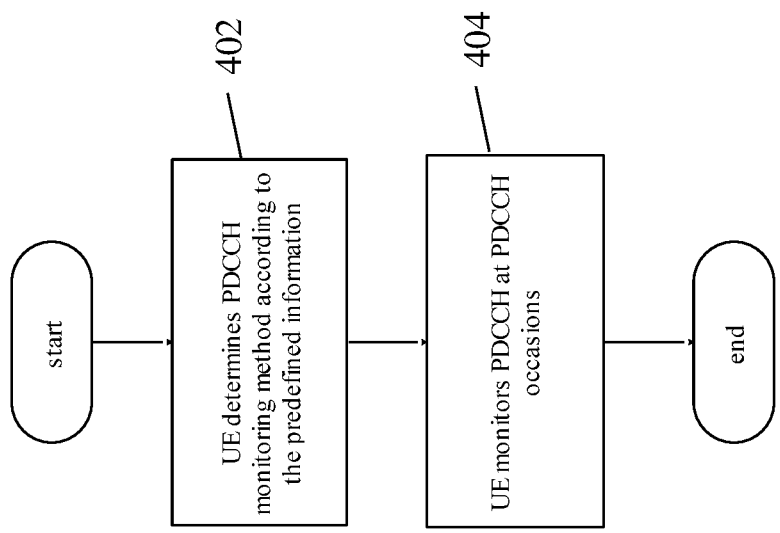
FIG. 4 shows an exemplary technique for a UE to determine PDCCH monitoring method or mode at UE side.
Figure 5:
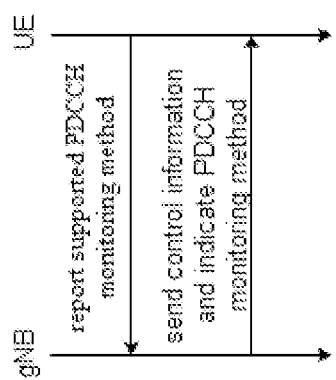
FIG. 5 shows an exemplary sequence diagram of a base station indicating a PDCCH monitoring method to the UE based on receiving reporting information from UE.

FIG. 4 shows a flow for a UE to determine PDCCH monitoring method or mode at UE side. At operation 402, the UE determines a PDCCH monitoring method based on or according to predefined information sent by the gNB and received by the UE. At operation 404, the UE monitors PDCCH at the PDCCH occasions based on the determined PDCCH monitoring method.

The UE monitors the PDCCH in the current PDCCH monitoring mode. When the resource configured by the base station changes to the UE or the UE automatically switches the resource information, the UE determines an appropriate PDCCH monitoring mode according to the predefined information. For example, as further explained below in modes 1 to 9 of Embodiment 2, the UE may skip PDCCH monitoring or switch PDCCH periodicity parameters or perform other operations based on the predefined information received by the UE from the gNB.

Mode 1: The predefined information is time domain indication information

When the interval of DCI scheduling data carried by the PDCCH and the current PDCCH is k0 slots or N symbols, the UE may skip the PDCCH monitoring of this time length (e.g., k0 slots or N symbols), or switch the PDCCH monitoring periodicity parameters to avoid monitor PDCCH in the time interval. In this mode, the monitoring power consumption of the UE can be reduced by reducing unnecessary PDCCH monitoring.

Mode 2: The predefined information is frequency domain resource indication information The PDSCH frequency domain resource is indicated by DCI. When the UE determines that the scheduling frequency domain resource of the arriving PDSCH to be received by the UE is larger than a Threshold F such as $n_{PRB}>f1$ (f1>100) indicated by DCI, the UE considers that the data has more transmission information bits, or the modulation and coding scheme (MCS) level corresponds to a lower transmission code rate, and therefore requires more processing time. In this case, the UE may switch to another PDCCH monitoring mode that achieves a higher PDCCH monitoring frequency to promise the PDCCH monitoring occasions does not overlap with the PDSCH reception. On the other hand, if the UE determines that the scheduled frequency domain resources of the PDSCH to be received by the UE are smaller than a Threshold F such as $n_{PRB}<f2$ (f2<200) indicated by DCI, the UE may consider that the data transmission information bits are small, or the MCS level corresponds to a higher transmission code rate, and therefore requires less processing time. In this case, the UE may adopt a PDCCH monitoring mode that achieves a smaller PDCCH monitoring frequency to avoid missing the next downlink data scheduling PDCCH.

Mode 3: The predefined information is bandwidth part (BWP) ID information

When the UE is configured to switch to a new BWP, the UE may skip the PDCCH monitoring during the BWP switching time or handover period, or change the PDCCH monitoring periodicity parameters to avoid monitoring PDCCH in the BWP switching time.

In addition, if the UE is switched from the smaller BWP to the larger BWP, the UE may switch to another PDCCH monitoring mode that achieves a smaller PDCCH monitoring frequency; if the UE is switched from the larger BWP to the smaller BWP, the UE may switch to another PDCCH monitoring mode that achieves a higher PDCCH monitoring frequency. Where the smaller BWP indicates a default BWP, a initial BWP, a BWP with BW≤20 MHz, or a low power consumption BWP and so on.

Mode 4: The predefined information is CORESET information

When the UE performs PDCCH monitoring in multiple CORESETs such as the number of CORESETs larger than a threshold R, the UE may switch to another PDCCH monitoring mode that achieves a larger PDCCH monitoring frequency; otherwise, when the UE monitors only one CORESET PDCCH, the UE may switch to another PDCCH monitoring mode that achieves a smaller PDCCH monitoring frequency.

In addition, when the control resource set of the PDCCH common search space to be monitored by the UE is CORESET 0, the UE may switch to another PDCCH monitoring mode that achieves a larger PDCCH monitoring frequency; when the UE's allocated control resource set index is not 0, the UE may switch to another PDCCH monitoring mode that achieves a smaller PDCCH monitoring frequency.

Mode 5: The predefined information is carrier ID information

When the UE is scheduled a cross carrier, the UE may perform PDCCH monitoring in two different carriers with different SCS. Here, the UE may adopt a PDCCH monitoring mode that achieves a smaller PDCCH monitoring frequency on carrier with larger SCS, or adopt a PDCCH monitoring mode that achieves a larger PDCCH monitoring frequency on carrier with smaller SCS.

Mode 6: The predefined information is subcarrier spacing information

When the subcarrier spacing of the UE is larger than a Threshold S1 such as SCS>S1 (S1>60 KHz), the number of slots in each frame is more. In this case, the UE should switch to another PDCCH monitoring mode that achieves a higher PDCCH monitoring frequency than the current PDCCH monitoring frequency. When the subcarrier spacing of the UE is smaller than a Threshold S2 such as SCS<S2 (S2<120 KHz), the number of slots in each frame is larger. In this case, the UE can switch to another PDCCH monitoring mode that achieves a smaller PDCCH monitoring frequency than the current PDCCH monitoring frequency.

Mode 7: The predefined information is carrier aggregation level (AL) information When the aggregation level of the search space for the UE monitoring PDCCH is higher than a Threshold L1 such as AL>L1 (L1>8), the UE may adopt a PDCCH monitoring mode that achieves a higher PDCCH monitoring frequency than the current PDCCH monitoring frequency; otherwise, if the aggregation level of the search space for the UE monitoring PDCCH is higher than a Threshold L2 such as AL<L2 (L2<16), the UE may adopt a PDCCH monitoring mode that achieves a smaller PDCCH monitoring frequency than the current PDCCH monitoring frequency.

Mode 8: The predefined information is frequency range type (FR Type) information When a UE is configured with FR1 and FR2 at the same time, the UE may adopt a PDCCH monitoring mode that achieves a higher PDCCH monitoring frequency than the current PDCCH monitoring frequency. for the serving cell group of FR1; for the serving cell of FR2, the UE may adopt a PDCCH monitoring mode that achieves a smaller PDCCH monitoring frequency than the current PDCCH monitoring frequency.

Considering that the supported frequency of FR1 is lower than that of FR2, the supported largest SCS of FR1 is smaller than that of FR2. Therefore, if the UE is configured two FR types at the same time. For FR1 the UE may use a sparse periodic PDCCH monitoring, and for FR2 the UR may use a denser periodic PDCCH monitoring.

Mode 9: The predefined information is rank indication (RI) information

The UE obtains the RI value of the current channel by detecting the channel state, and reports the RI to the base station. When the RI value is larger than threshold R1 such as RI>R1(R1<3), the UE may adopt a PDCCH monitoring mode that achieves a higher PDCCH monitoring frequency than current PDCCH monitoring mode. When the RI value is 0 or smaller than R2 such as RI<R2(R2>0), the UE may adopt a PDCCH monitoring mode that achieves a smaller PDCCH monitoring frequency than current PDCCH monitoring mode.

Similarly, defining predefined information as Precoding Matrix Indication (PMI) is also applicable for the relationship between RI and PMI and antenna port number.

III. Embodiment 3: The UE Determines the PDCCH Monitoring Mode According to the Service Type Information The UE monitors the PDCCH in the current PDCCH monitoring mode. When the base station detects that the QoS state of the UE changes or the UE reports its current application or traffic demand to the base station by the assistance information, the UE determines an appropriate PDCCH monitoring mode according to the predefined information sending by base station. For example, skipping PDCCH monitoring, switching PDCCH Periodicity parameters, and so on.

When the 5QI value obtained at gNB side is one of the set1, where set1 is at least one of the values in [1, 2, 3, 4, 5, 6, 7, 65, 66, 67, 69, 70, 79, 80], the gNB may configure the UE a PDCCH monitoring mode that achieves a smaller PDCCH monitoring frequency, or indicate the UE to skip PDCCH monitoring a duration according to the current UE's buffer status. When the 5QI value is not in the set1, the gNB may configure the UE a appropriate PDCCH monitoring mode according to the current UE's buffer status.

IV. Embodiment 4: The UE Determines the PDCCH Monitoring Mode According to the Power Saving Policy or the Power Saving Parameters The UE monitors the PDCCH in the current PDCCH monitoring mode. When the power saving policy may be adopted by the UE, the UE may determine an appropriate PDCCH monitoring mode such as skipping PDCCH monitoring, switching PDCCH periodicity parameter, and so on according to the power saving policy or parameters.

Mode 1: When the UE configures the DRX, the UE may adopt a PDCCH monitoring mode that achieves a higher PDCCH monitoring frequency at the starting of DRX On duration. After the PDCCH is successfully decoded, or the DRX Inactivity timer starts counting N slots, the UE may adopt a PDCCH monitoring mode that achieves a smaller PDCCH monitoring frequency.

Mode 2: When the UE switches from a long DRX cycle to a short DRX cycle, the UE may adopt a PDCCH monitoring mode that achieves a higher PDCCH monitoring frequency to reduce the latency. Inversely, the UE may adopt a PDCCH monitoring mode that achieves a smaller PDCCH monitoring frequency sparse periodic PDCCH monitoring mode to reduce unnecessary PDCCH monitoring. The PDCCH monitoring periodicity, PDCCH monitoring duration, and the PDCCH monitoring period starting position are all related to the configuration of DRX cycle, DRX On duration and DRX Inactivity timer.

Mode 3: In the case of non DRX configuration, the UE may determine the PDCCH monitoring mode by counting the number of monitored PDCCHs during a length of time.

V. Embodiment 5: The UE Determines the PDCCH Monitoring Mode According to the Reference Signal The UE monitors the PDCCH in the current PDCCH monitoring mode. When the UE receives or transmits one or more reference signals, the UE determines an appropriate PDCCH monitoring mode according to the predefined information. For example, skipping PDCCH monitoring, switching PDCCH periodicity parameters, and so on.

Mode 1: When the UE is configured with the CSI-Mask, the UE may not report the CSI, and the PDCCH monitoring is unnecessary during the length of time. Therefore, CSI-Mask can be used to determine the skipping PDCCH monitoring mode for the UE.

Mode 2: After successfully decoding the PDCCH for the UE, UE needs to receive CSI-RS and report CSI to gNB for receiving PDSCH according to the DCI indication. If there is no data scheduling during the CSI-RS, the UE may adopt the skipping PDCCH monitoring mode. Until the CSI reporting is completed or downlink data arrives (e.g., PDSCH time is scheduled), the UE may switch to the configured or last recent PDCCH periodicity monitoring mode.

Mode 3: The UE determines a PDCCH monitoring mode according to a Demodulation Reference Signal (DMRS). The gNB uses the DMRS such as type or the number of port to implicitly indicate the PDCCH monitoring mode and the monitoring parameters of the UE. For example, when the UE receives DMRS with type1, the UE may adopt the skipping PDCCH monitoring mode; when the UE receives DMRS with type 2, the UE may use the PDCCH periodicity monitoring.

Mode 4: The UE determines the PDCCH monitoring mode according to the HARQ-ACK. The 1-bit information of HARQ-ACK is periodically transmitted, and the specific period is a part of {2, 4, 5, 8, 10, 16, 20, 40, 80, 160, 320, 640, 1280, 2560} slots. When the UE detects the HARQ-ACK with the indication of 'ACK', the UE may select the PDCCH periodicity monitoring mode; when the UE detects the HARQ-ACK with the indication of 'NACK', the UE may select the skipping PDCCH monitoring mode until the next HARQ-ACK detection occasion.

In this mode, the 1-bit HARQ-ACK is used to indicate the PDCCH monitoring mode, with lower power consumption and the high reliability.

Mode 5: The UE determines the PDCCH detection mode according to the synchronization reference signal (TRS). The TRS can implicitly indicate the UE to select a PDCCH monitoring mode according to such as the number of port of the TRS or the initial value of the sequence of the TRS.

Mode 6: The UE determines a PDCCH monitoring mode according to a sounding reference signal (SRS). The UE also determines a PDCCH monitoring mode according to the 2-bit indication of the SRS request field or the sequence initial value of the SRS.

The above modes mainly use the information carried by the reference signal to indicate UE to select the PDCCH monitoring mode, which can effectively reduce unnecessary PDCCH monitoring.

VI. Embodiment 6: The UE Determines the PDCCH Monitoring Mode According to L1/L2/L3 Signaling Mode 1: The UE dynamically switches or determines the PDCCH monitoring mode according to the L1 signaling, for example, the UE determines the PDCCH monitoring mode according to the corresponding field in the DCI. In this way, the indication delay can be reduced, and the DCI information carried by the PDCCH can ensure high reliability and low latency.

Mode 2: The UE switches or determines the PDCCH monitoring mode according to the L2 signaling, for example, the UE switches the PDCCH monitoring mode according to the MAC CE. In this mode, the UE can be configured to switch the PDCCH monitoring mode by DRX Command MAC CE and the Long DRX Command MAC CE triggering the UE to perform the skipping PDCCH monitoring mode with the start position and the skipping PDCCH monitoring duration, or a new RA Command MAC CE to terminate the running ra-Response Window or ra-ContentionResolutionTimer in advance to trigger UE to skip the PDCCH monitoring under the case of no HARQ, CSI, SRS, etc. By the way, the skipping PDCCH monitoring duration can also indicate by L3 signaling or L1 signaling.

Mode 3: The UE indicates the PDCCH monitoring behavior according to the L3 signaling. For example, the UE determines the PDCCH monitoring mode according to the PDCCH-Config field in the RRC signaling SearchSpace IE. Where the PDCCH monitoring duration may be extended to (0-2559) slots by supporting a complementary value 0 (when the duration is absent, the default duration is 0). That is, when the PDCCH monitoring duration is absent, the PDCCH monitoring of UE is stopped, namely the skipping PDCCH monitoring mode. If the UE adopts the skipping PDCCH monitoring mode, the skipping PDCCH duration is n*Ks slots, where n is the number of persistent PDCCH periodicity. The skipping PDCCH duration may also be indicated by the SearchSpace IE, where the parameter is $a*2^n$, a is a prime number greater than 0, and n is an non-negative integer, and the value ranges from $0 \leq n \leq 10$.

In addition, the PDCCH monitoring parameters in the PDCCH-Config field of the RRC signaling SearchSpace IE can include two parts, one part for PDCCH periodicity monitoring mode (including Ks, Os, Ts, the monitoring symbols) and the other part for skipping PDCCH monitoring mode (including the start position and the skipping duration).

Figure 8:
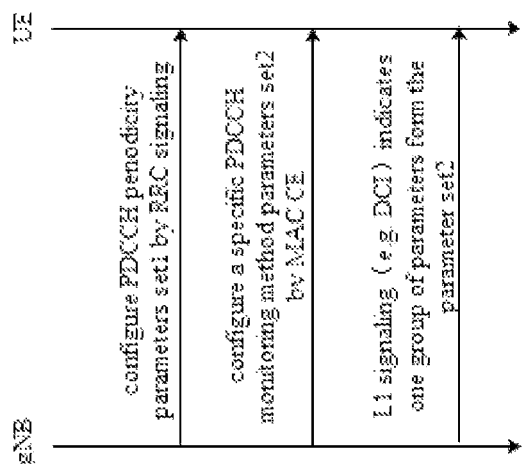
FIG. 8 shows an exemplary technique to configure PDCCH monitoring method.

Mode 4: The UE can dynamically select the PDCCH monitoring mode through RRC signaling/MAC CE/L1 signaling. FIG. 8 shows an exemplary technique to configure PDCCH monitoring method. Firstly, PDCCH monitoring parameters Set1 consisting of a set of skipping PDCCH monitoring mode parameters including the start skipping position and skipping duration or PDCCH periodicity monitoring parameters are selected from the PDCCH monitoring parameter table according to UE capability and configured for UE by RRC signaling semi-persistently. Secondly, the PDCCH monitoring parameters Set2 suitable for the current MAC entity is selected from PDCCH monitoring parameters Set1 and configured by MAC CE for UE. Finally, a PDCCH monitoring parameter is selected from the PDCCH monitoring parameters Set2 and configured by L1 signaling dynamically, such as DCI.

In addition, UE can switch or choose PDCCH monitoring mode according to the predefined information in sections VII to XI by the configuration of RRC signaling/MAC CE. Where the configuration of RRC signaling/MAC CE can be the PDCCH monitoring parameters sets (Ks, Ts, Os, skipping duration, skipping start position, etc.), or the PDCCH monitoring periodicity or frequency (e.g., Ts/Ks), or the PDCCH monitoring mode indicator.

In addition, UE can perform switching or choosing PDCCH monitoring mode according to the predefined information in sections VII to XI triggered by a PS-DCI or PS signal transmitted from gNB.

Sections VII to XI describe exemplary PDCCH monitoring modes. UE may choose one of the PDCCH monitoring modes in each section according to the above pre-defined information.

VII. Embodiment 7: Skipping PDCCH Monitoring Mode and Switching PDCCH Periodicity Monitoring Mode do not Occur Simultaneously Mode 1: The UE selects one mode from the monitoring modes that the skipping PDCCH monitoring mode and the non-skipping PDCCH monitoring mode according to the predefined information.

It is assumed that the priority of skipping PDCCH monitoring mode is higher than that of switching PDCCH periodicity monitoring mode in this scheme.

The UE performs the PDCCH monitoring with the (Ts, Ks, Os) parameter configuration. After monitoring to the PDCCH, according to the DCI indication, the UE may switch to skipping PDCCH monitoring mode with the start skipping position and the skipping PDCCH monitoring duration. In the skipping PDCCH monitoring operation, the UE does not perform any PDCCH monitoring operation during the skipping duration or the skip-PDCCH Timer counting. When the skip-PDCCH timer expires, or the skipping duration ends, the UE may perform the PDCCH monitoring operation by using the most recent (Ts, Ks, Os) parameter configuration if there are no new configuration of PDCCH periodicity monitoring mode. Or the UE may perform the PDCCH monitoring operation configured by RRC signaling or MAC CE.

Figure 6:
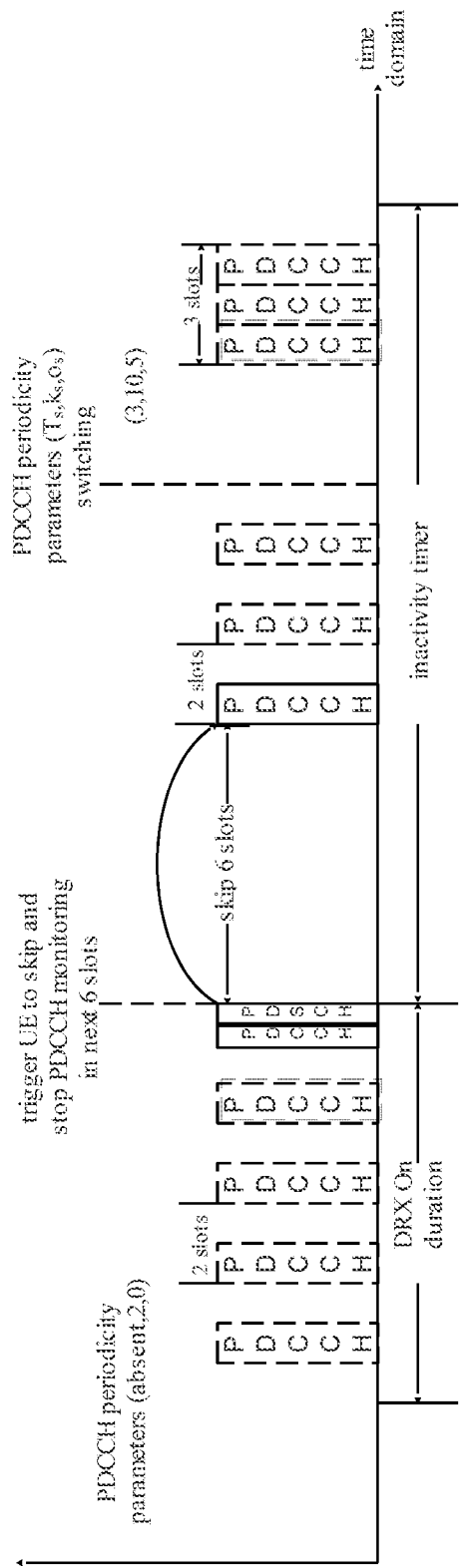
FIG. 6 shows an exemplary power saving scheme with DRX configured.

For example, as shown in FIG. 6, the UE monitors PDCCH on the BWP with SCS=30 kHz. At the start position of the DRX On duration, the UE performs PDCCH monitoring with parameters (absent, 2, 0), that is, Ts=1 slot, Ks=2 slots, Os=0. The UE starts the PDCCH monitoring at slot with even index in each 2 slots periodicity. After the PDCCH is monitored, the UE performs to skip PDCCH monitoring with 6 slots indicated by DCI. When the skip-PDCCH timer expires, or the skipping duration ends, the UE still performs PDCCH monitoring with parameters (absent, 2, 0) if no new configuration. After receiving the new configuration (3, 10, 5), the UE performs PDCCH monitoring with the new parameter configuration until the inactivity timer expired.

Figure 7:
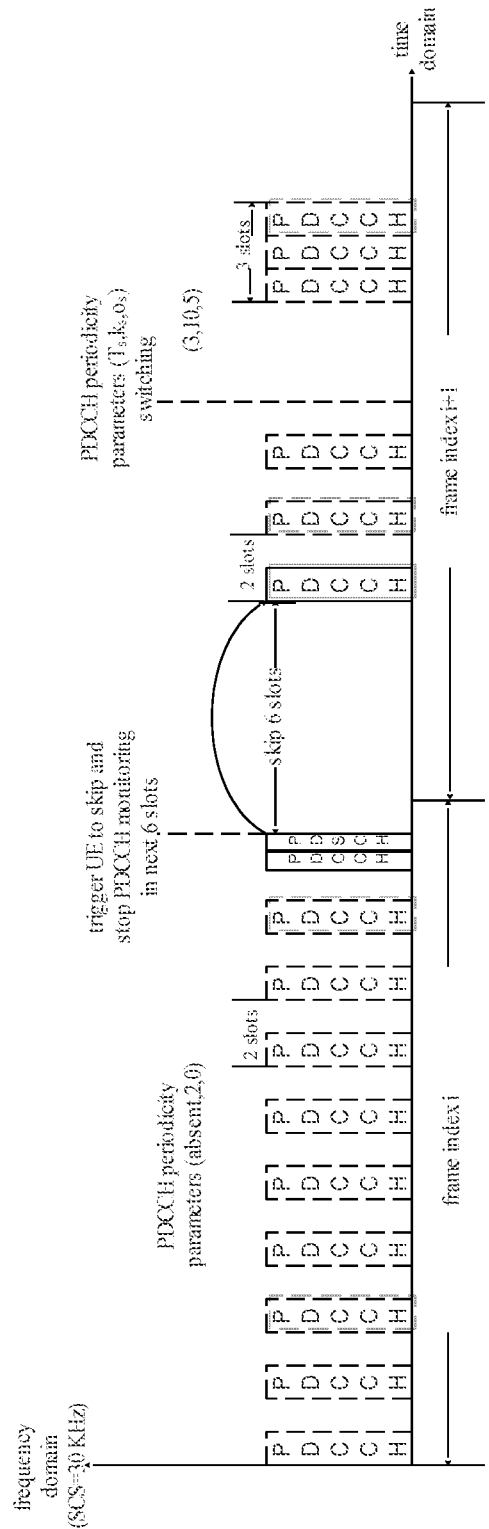
FIG. 7 shows an exemplary power saving scheme without DRX configured.

For another example, as shown in FIG. 7, the UE without DRX configuration is assumed the same configuration procedure.

Mode 2: The UE selects one mode from the adjusting PDCCH monitoring frequency mode and the non-adjusting the PDCCH monitoring frequency mode according to the predefined information.

For the adjusting PDCCH monitoring frequency mode, the UE adjusts the PDCCH monitoring frequency according to the predefined information in Embodiments 1-6. For the non-adjusting PDCCH monitoring frequency mode, the UE can not adjust the PDCCH monitoring periodicity such as the skipping PDCCH monitoring operation or keeping the current PDCCH periodicity monitoring mode.

For example, the PDCCH monitoring frequency for the UE is adjusted from ¾ to ¼ indicated by higher layer parameters or according to the predefined information, the UE may reduce PDCCH monitoring frequency indicated by L1 signaling or increase PDCCH monitoring periodicity according to the predefined information. If there are other higher priority operations, the UE may stop or not expect to adjust the PDCCH monitoring frequency.

VIII. Embodiment 8: Combination of Skipping PDCCH Monitoring and Switching PDCCH Periodicity Method 1: The UE selects a adjusting PDCCH monitoring frequency mode with one parameter set from the adjusting PDCCH monitoring frequency mode with multiple candidate parameter sets according to the predefined information.

For example, among the multiple candidate parameter sets, one part of parameter sets are used to achieve skipping the PDCCH monitoring, and the others are used to achieve the PDCCH periodicity monitoring modes.

The UE performs PDCCH monitoring by the (Ts, Ks, Os) parameter set in the corresponding PDCCH occasions. If the UE supports the adjusting PDCCH monitoring periodicity operation and reports it to gNB. The gNB may indicate the UE the parameter sets (Ts1, Ks1, Os1) can achieving the skipping PDCCH monitoring operation for a period of time according to the UE's current data buffer states by RRC signaling/MAC CE/L1 signaling.

When the value of PDCCH monitoring duration Ts1 is 0 or the 14 information bits of monitoringSymbolsWithinSlot field in SearchSpace IE are all zero. UE can directly skip PDCCH monitoring with (n*Ks) slots duration. While Ts1 is large than 0 and the 14 information bits of monitoringSymbolsWithinSlot field in SearchSpace IE are not all zero, the UE can only skip PDCCH monitoring with duration not larger than Ks. In addition, the end position of the parameter sets supported skipping PDCCH monitoring should be indicated by the consecutive number of PDCCH monitoring periodicity or skipping duration, or triggered by the new PDCCH periodicity monitoring configuration. Where the consecutive number of PDCCH monitoring periodicity or skipping duration can be indicated by RRC signaling.

During the skipping PDCCH monitoring time, the UE may not perform any PDCCH monitoring operation, and may use the skip-PDCCH Timer for timing. After the skip-PDCCH timer expires, the UE may adopt a new (Ts', Ks', Os') parameter configuration configured by the base station or the UE performs a PDCCH monitoring operation using the most recent (Ts, Ks, Os) parameter configuration combination.

Figure 9:
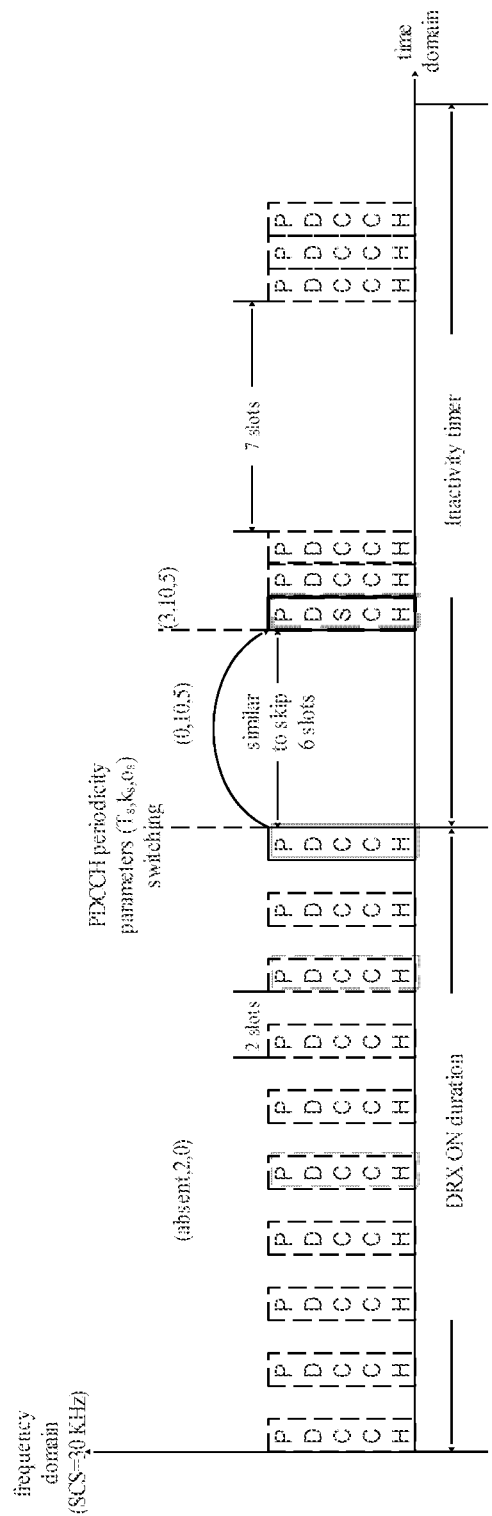
FIG. 9 shows another exemplary power saving scheme with DRX configured.

For example, as shown in FIG. 9, the subcarrier spacing of the frequency band occupied by the UE is 30 kHz. At the start position of the DRX On duration, the UE takes (absent, 2, 0), that is, Ts=1 slot, Ks=2 slots, Os=0 parameter. In the configuration, the UE starts from the even index slot, and performs PDCCH monitoring for the first slot in the 2 slots period. After the PDCCH is monitored, the UE performs a skip 6 slots operation according to the high-level configuration parameters (3, 10, 5). After the operation is completed, the UE is not configured with a new parameter combination, and the PDCCH is still used (3, 10, 5). Monitor and expire until the inactivity timer expires. Until the inactivity timer expires. In this process, if the PDCCH indicates an operation such as BWP handover, the PDCCH monitoring operation may be performed after switching to the new BWP and after the PDSCH reception is completed.

Figure 10:
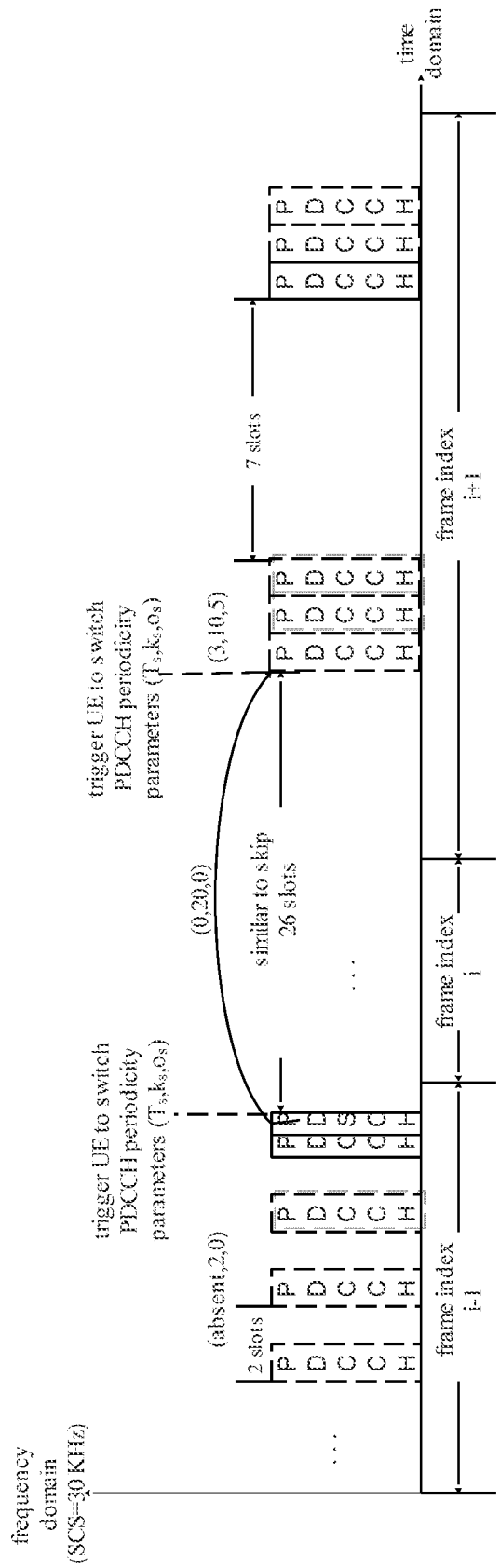
FIG. 10 shows another exemplary power saving scheme without DRX configured.

For example, as shown in FIG. 10, the subcarrier spacing of the frequency band occupied by the UE is 30 kHz. At the beginning of the 0th frame, the UE takes (absent, 2, 0), that is, Ts=1 slot, Ks=2 slots, Os=0 parameter. In the configuration, the UE starts from the even index slot, and performs PDCCH monitoring for the first slot in the 2 slots period. After the PDCCH is monitored, the UE performs a skip 26 slots operation according to the higher layer parameters (0, 20, 0). After the operation is completed, the UE is configured with a new parameter set, and the UE may monitor PDCCH by the new parameter (3, 10, 5) configured by higher layer parameter.

Method 2: The UE selects a adjusting PDCCH monitoring mode with one parameter set from the adjusting PDCCH monitoring mode with multiple candidate parameter sets according to the predefined information.

Where the multiple candidate parameter sets of the adjusting PDCCH monitoring mode can support either the skipping PDCCH monitoring mode or the PDCCH periodicity monitoring mode by two different parameter set configurations. The one parameter set includes the starting position of skipping PDCCH monitoring, and/or the skipping duration, and/or the skipping timer, and/or the end position of skipping PDCCH monitoring. The other parameter set includes the current parameters in the PDCCH-Config field of SearchSpace IE. In addition, the UE should add both the PDCCH monitoring modes into its feature list to efficiently inform gNB of its supported PDCCH monitoring mode by assistance information.

Method 3: The UE selects a skipping PDCCH monitoring mode with one parameter set selected from the PDCCH skipping with multiple candidate parameter sets according to the predefined information.

In this Method, for a UE that does not support the PDCCH monitoring periodicity mode, the UE can directly monitor PDCCH by using the skipping PDCCH monitoring mode with parameters configured by gNB to achieve power saving. Where the parameter set includes the starting position of skipping PDCCH monitoring, and/or the skipping duration, and/or the skipping timer, and/or the end position of skipping PDCCH monitoring. The UE can be also indicated to skip PDCCH monitoring by a periodicity signal.

When the UE is not perform skipping PDCCH monitoring, the UE with no capability of PDCCH periodicity monitoring may start to continuously monitor the PDCCH on each slot or monitor PDCCH by a default PDCCH monitoring behavior.

Figure 11:
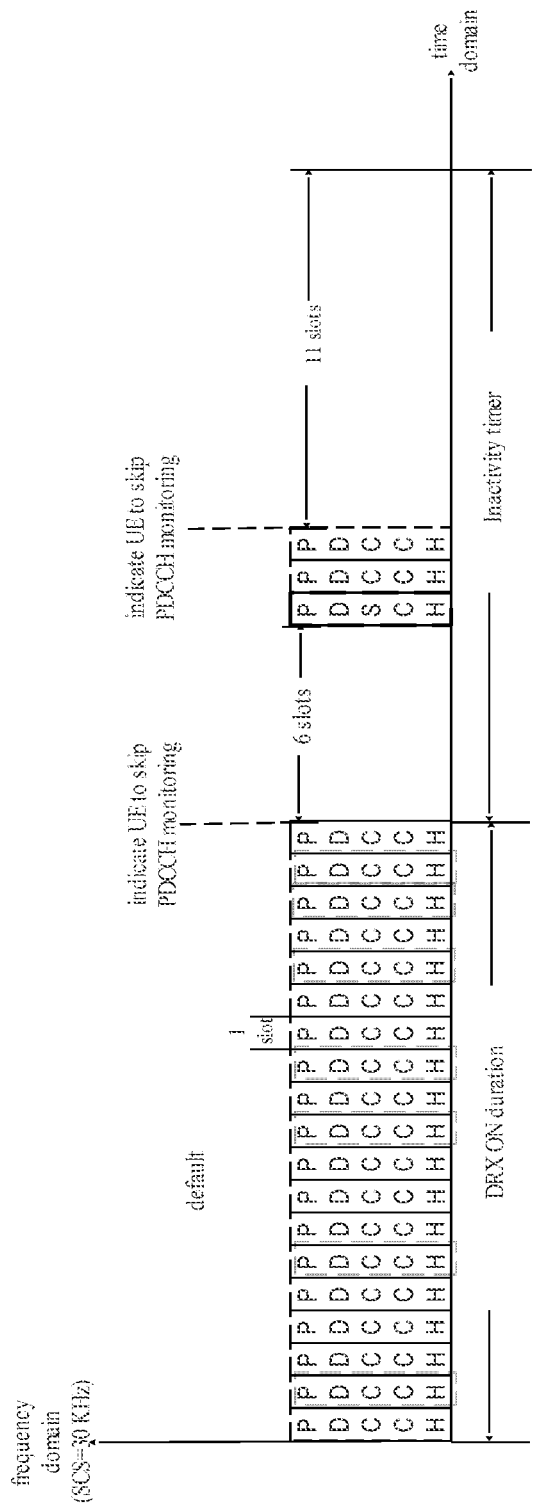
FIG. 11 shows yet another exemplary power saving solution with DRX configured.

For example, as shown in FIG. 11, it is assumed that the subcarrier spacing of the UE is 30 kHz, and the total number of slots in one frame is 20. The UE performs continuous PDCCH monitoring at the start position of the DRX On duration. After monitoring the PDCCH for the first time, it skips the PDCCH monitoring of 6 slots according to the indication of the downlink control information. The UE starts to fall back to the continuous PDCCH monitoring state after the end of the operation, and if the PDCCH is not detected by the consecutive N slots, the UE configures the UE to skip the PDCCH monitoring for a duration, or the UE automatically The skip PDCCH operation is performed until the DRX Inactivity timer expires.

When the DRX is not configured, the UE always performs the continuous monitoring of the PDCCH. After the PDCCH is monitored, the UE performs the PDCCH monitoring operation of skipping the N slots according to the downlink control information indication, and continues to execute the continuous PDCCH at the first slot position after the end. monitoring operation. If the PDCCH is not monitored by the consecutive M PDCCHs, the skip PDCCH monitoring operation is automatically performed by the high layer parameter indication or the UE.

Figure 12:
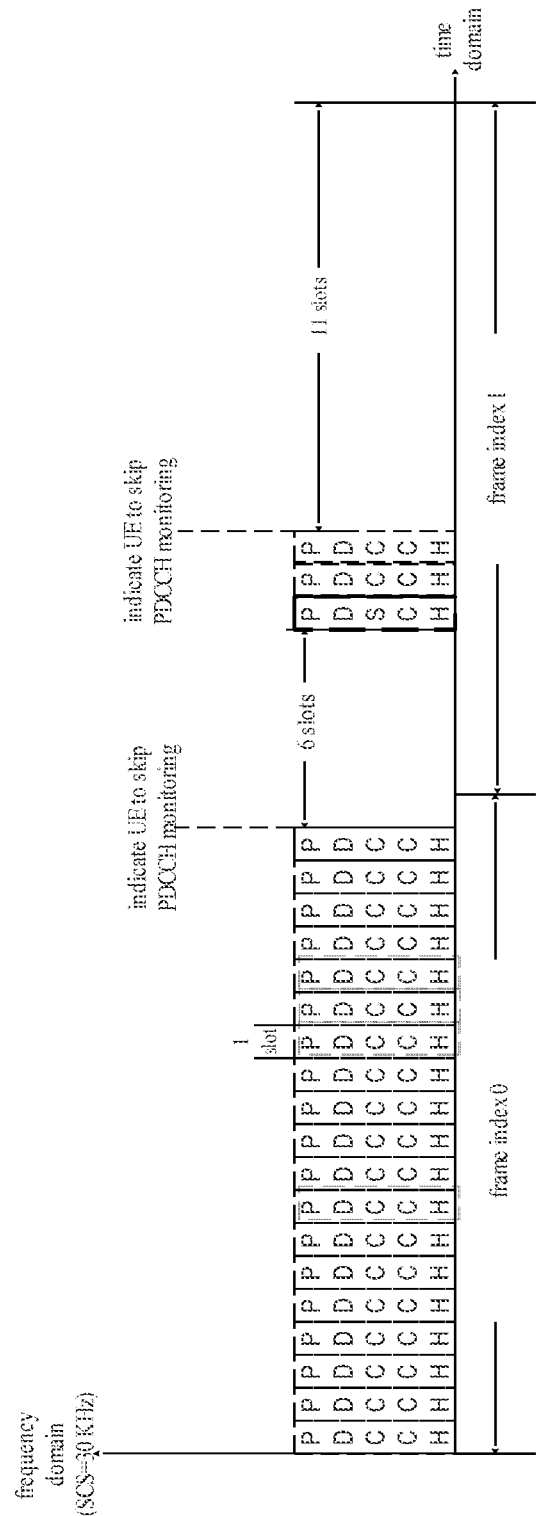
FIG. 12 shows yet another exemplary power saving scheme without DRX configured.

For example, as shown in FIG. 12, it is assumed that the subcarrier spacing of the UE is 30 kHz, and the total number of slots in one frame is 20. The UE performs PDCCH monitoring at each slot. If the PDCCH is monitored, the UE performs a skip PDCCH monitoring operation according to the downlink control resource indication, and performs continuous PDCCH monitoring at the first slot start position after the duration ends. If the PDCCH is not monitored within the M slots, the PDCCH operation skipping for a duration is automatically performed by the higher layer signaling or by the UE.

Method 4: UE chooses one PDCCH monitoring mode from the periodic PDCCH monitoring mode and the aperiodic PDCCH monitoring mode.

When the UE choose the periodic PDCCH monitoring mode, the UE may perform PDCCH monitoring by the (Ts, Ks, Os) parameters in the corresponding PDCCH occasions. When the UE choose the aperiodic PDCCH monitoring mode, the UE may perform PDCCH monitoring by the parameters including the starting position of aperiodic PDCCH monitoring, the duration of aperiodic PDCCH monitoring by RRC signaling/MAC CE/L1 signaling.

IX. Embodiment 9: Skip PDCCH Monitoring

The UE selects a monitoring mode of reducing the PDCCH monitoring period of one parameter set from the monitoring mode of reducing the PDCCH monitoring period with multiple candidate parameter sets according to the predefined information.

The plurality of candidate parameter sets includes a PDCCH monitoring period, a PDCCH monitoring duration, and a PDCCH monitoring period starting position.

X. Embodiment 10: Switch PDCCH Periodicity

Mode 1: The UE selects one mode from the monitoring mode of the reduced PDCCH monitoring period with the first type of parameters and the monitoring mode of the reduced PDCCH monitoring period of the second type of parameters according to the predefined information.

The first type of parameters refer to the PDCCH monitoring period and the PDCCH monitoring duration, and the PDCCH monitoring period starting position, where T>0, K>0, P>0. The second type of parameters refer to the PDCCH monitoring period K and the PDCCH monitoring duration T, and the PDCCH monitoring period starting position P, where T>=0, K>0, P>0, and where K is the number of slots that is equal to $a*2^n$, where a is a prime, and n is a non negative integer. T is not larger than K.

Mode 2: The UE selects one mode from the monitoring mode of reducing PDCCH monitoring periodicity and monitoring mode of not reducing PDCCH monitoring periodicity.

The parameters of the two modes include the same as the current parameters in the PDCCH-Config field of SearchSpace IE. The values of the parameters of the monitoring mode of reducing PDCCH monitoring periodicity include the frequency of PDCCH monitoring occasion is not larger than f1, where f1 is not larger than 1 and not less than 1/2. The values of the parameters of the monitoring mode of not reducing PDCCH monitoring periodicity include the frequency of PDCCH monitoring occasion is not less than f2, where f2 is not larger than 1/2 and not less than 1/2560. where the frequency of PDCCH monitoring occasion is that the PDCCH monitoring periodicity is divided by the PDCCH monitoring duration. Where the frequency of PDCCH monitoring occasion is that the PDCCH monitoring periodicity is divided by the PDCCH monitoring duration.

In the above Embodiments 7 to 10, the UE may choose a PDCCH monitoring mode from different PDCCH monitoring modes according to the predefined information described in Embodiments 1 to 6. If there are any operation with the priority higher than that of PDCCH monitoring or PDCCH monitoring mode determination, the UE may not monitor PDCCH.

XI. Embodiment 11: Skip PDCCH Monitoring and Switch PDCCH Periodicity are Triggered by a Signal Indication The PDCCH monitoring mode described in Embodiments 8 to 10 is triggered by a signal.

Scheme 1: Skip PDCCH monitoring and switch PDCCH Periodicity are triggered by HARQ-ACK, when the HARQ-ACK is NACK, the skip PDCCH monitoring is indicated, and when the HARQ-ACK is ACK, the switch PDCCH Periodicity is indicated. The HARQ-ACK may also be used to indicate that the 1 bit indicates the monitoring PDCCH operation of a group of UEs, and each UE is grouped by the base station according to the UE ID or the CRC scrambling RNTI type of the DCI format to be received by each UE. The scheme multiplexes HARQ-ACK, indicating that there are few bits, and the power consumption for detecting the information is also small.

Scheme 2: The foregoing solution may be indicated by a DCI for power saving, 1 bit indicates the monitoring behavior of a single UE, and N bits is used to indicate the monitoring behavior of the N UEs. If the UE supports A or switch PDCCH Periodicity to monitor the PDCCH, the DCI may indicate whether to perform the skip PDCCH behavior (1 bit) every 4 bits, and the $2^n$*TA long skip PDCCH monitoring time (3 bits) when the DCI is to indicate skip PDCCH monitoring), from left to right, the last 3 bits are used to indicate the index n, $0 \le n \le 7$, TA is the current PDCCH monitoring period, which can be obtained by configuring the parameter mapping table, when different DRX configuration parameters or 5QI indexes, There are different skip PDCCH monitoring parameter tables. Although this solution requires additional overhead, using DCI to carry this information can ensure optimal performance of missed detection rate and false alarm rate.

Scheme 3: The CSI mask instructs the UE to perform a PDCCH monitoring operation of skip PDCCH monitoring, switch PDCCH periodicity or skip PDCCH monitoring and switch PDCCH Periodicity. This solution does not require additional overhead and is highly reliable.

Scheme 4: The PDCCH snooping operation of the A/B/skip PDCCH monitoring and switch PDCCH Periodicity is indicated by the slot format indication field in the DCI. The program has no additional overhead, and the missed detection rate and false alarm rate performance are better. For example, if the base station configures the UE to perform skip PDCCH monitoring, the DCI may only need to use a specific null index in the slot format indication mapping table to instruct the UE to perform a PDCCH monitoring operation.

Scheme 5: The skip PDCCH monitoring operation is triggered by a new low power signal indication.

Figure 13:
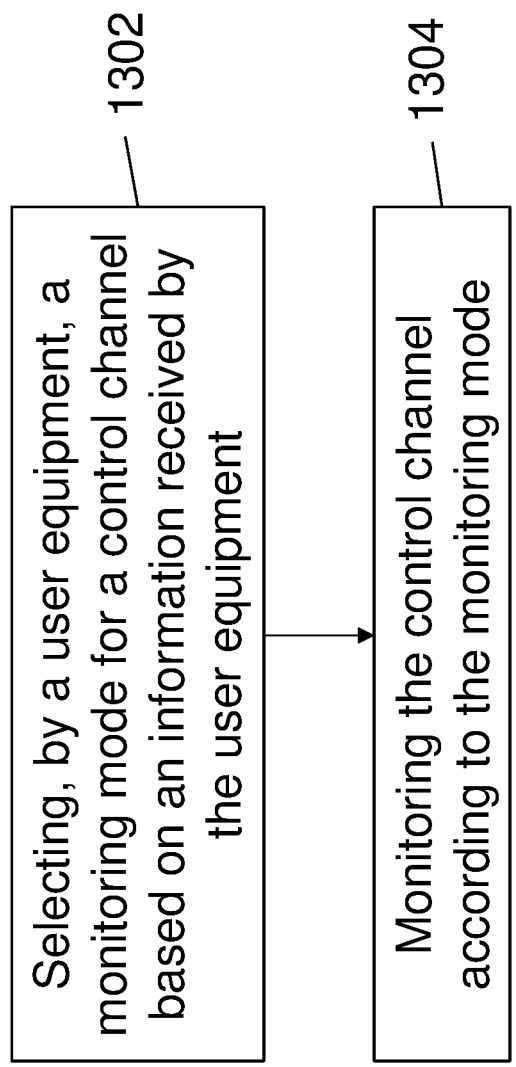
FIG. 13 shows an exemplary flowchart for monitoring a control channel.

FIG. 13 shows an exemplary flowchart for monitoring a control channel. At the selecting operation 1302, a user equipment selects or determines a monitoring mode for a control channel based on an information received by the user equipment. The monitoring mode is selected from a plurality of monitoring modes for one or more control channels. At the monitoring operation 1304, the user equipment monitors the control channel according to the monitoring mode.

In a first implementation of some embodiments, the selected monitoring mode is one of a first monitoring mode that skips control channel monitoring and a second monitoring mode that does not support skipping control channel monitoring. In the first implementation, a first set of parameters of the first monitoring mode include: a starting position when control channel monitoring is skipped, or a duration for skipping control channel monitoring, or a parameter associated with a timer, and a second set of parameters of the second monitoring mode include: a control channel monitoring periodicity, or a starting position offset, or a monitoring duration in a periodicity, or monitoring symbols of a slot in the monitoring duration.

In the first implementation, the starting position is not less than 0 or is a value of null, the duration for skipping control channel monitoring is a number of slot that is not less than 0 or is equal to the multiple of $\alpha$ and $2^n$, where $\alpha$ is an integer that is not less than 0 and n is an integer that is not less than 0 and not larger than 10, the control channel monitoring periodicity is the number of slot that is greater than 0 slot, the starting position offset is less than the control channel monitoring periodicity, and the monitoring duration is the number of slot that is greater than 0 and not larger than the control channel monitoring periodicity, and a starting slot index of the monitoring duration is associated with the control channel monitoring periodicity and the starting position offset.

In a second implementation of some embodiments, the selected monitoring mode is one of a first monitoring mode that reduces a control channel monitoring frequency and a second monitoring mode that does not reduce the control channel monitoring frequency. In the second implementation, a first set of parameters of the first monitoring mode include: a first control channel monitoring periodicity Ks1, or a starting position offset, or a first monitoring duration in a periodicity Ts1, or monitoring symbols of a slot in the first monitoring duration, a second set of parameters of the second monitoring mode include: a second control channel monitoring periodicity Ks2, or the starting position offset, or a second monitoring duration in a periodicity Ts2, or monitoring symbols of a slot in the second monitoring duration, where Ks1>Ks2 or Ts1<Ts2, or where the control channel monitoring frequency is a value obtained by either dividing the first monitoring duration in a periodicity by the first control channel monitoring periodicity or by dividing the second monitoring duration in a periodicity by the second control channel monitoring periodicity.

In the second implementation, the first or second control channel monitoring periodicity is a number of slot that is greater than 0 slot, the starting position offset is less than the first or second control channel monitoring periodicity, the first monitoring duration is the number of slot that is greater than 0 and not larger than the first control channel monitoring periodicity, respectively, the second monitoring duration is the number of slot that is not less than 0 and not larger than the second control channel monitoring periodicity, respectively, and a starting slot index of the first or second monitoring duration is associated with the first or second control channel monitoring periodicity, respectively, and the starting position offset.

In the second implementation, a set of parameters of the first monitoring mode include: a modifying factor δ of a control channel monitoring frequency, or a control channel monitoring periodicity offset, or a starting position of a modifying control channel monitoring frequency, or a stopped position of the modifying control channel monitoring frequency, or a duration of the modifying control channel monitoring frequency, where the control channel monitoring frequency is a value obtained by dividing a monitoring duration in a periodicity by a control channel monitoring periodicity.

In the second implementation, the modifying factor δ is $2^n$, where n is not greater than 0, the control channel monitoring periodicity offset is a number of slot that is greater than 0 and is associated with δ, the starting position of the modifying control channel monitoring frequency is associated with the control channel monitoring periodicity offset, the stopped position of the modifying control channel monitoring frequency is associated with the control channel monitoring periodicity offset, and the duration of the modifying control channel monitoring frequency is the number of slot that is greater than 0.

In a third implementation of some embodiments, the selected monitoring mode is a first monitoring mode that skips control channel monitoring mode and a second monitoring mode that reduces a control channel monitoring frequency. In the third implementation, a first set of parameters of the first monitoring mode include: a starting position when control channel monitoring is skipped, or a duration for skipping control channel monitoring, or a parameter associated with a timer, a second set of parameters of the second monitoring mode include: a control channel monitoring periodicity, or a starting position offset, or a monitoring duration in a periodicity, or monitoring symbols of a slot in the monitoring duration, and where the control channel monitoring frequency is a value obtained by dividing the monitoring duration in the periodicity by the control channel monitoring periodicity.

In the third implementation, the starting position is not less than 0 or is a value of null, the duration for skipping control channel monitoring is a number of slot that is not less than 0 or is equal to the multiple of α and $2^n$, where α is an integer that is not less than 0, and n is an integer that is not less than 0 and not larger than 10, the control channel monitoring periodicity is the number of slot that is greater than 0 slot, the starting position offset is less than the control channel monitoring periodicity, the monitoring duration is the number of slot that is greater than 0 and not larger than the control channel monitoring periodicity, and a starting slot index of the monitoring duration is associated with the control channel monitoring periodicity and the starting position offset.

In the third implementation, a set of parameters of the second monitoring mode include: a modifying factor δ of the control channel monitoring frequency, or a control channel monitoring periodicity offset, or a starting position of a modifying control channel monitoring frequency, or a stopped position of the modifying control channel monitoring frequency, or a duration of the modifying control channel monitoring frequency, and where the control channel monitoring frequency is a value obtained by dividing the monitoring duration in a periodicity by a control channel monitoring periodicity.

In the third implementation, the modifying factor δ is $2^n$, where n is not greater than 0, the control channel monitoring periodicity offset is a number of slot that is greater than 0 and is associated with δ, the starting position of the modifying control channel monitoring frequency is associated with the control channel monitoring periodicity offset, the stopped position of the modifying control channel monitoring frequency is associated with the control channel monitoring periodicity offset, and the duration of the modifying control channel monitoring frequency is the number of slot that is greater than 0.

In a fourth implementation of some embodiments, the selected monitoring mode is one of a first monitoring mode that reduces a control channel monitoring frequency with a first type of parameters and a second monitoring mode that reduces the control channel monitoring frequency with a second type of parameters. In the fourth implementation, a first set of parameters of the first monitoring mode include: a first control channel monitoring periodicity Ks1, or a starting position offset, or a first monitoring duration in a periodicity Ts1, or monitoring symbols of a slot in the monitoring duration, a second set of parameters of the second monitoring mode include: a second control channel monitoring periodicity Ks2, or the starting position offset, or a second monitoring duration in a periodicity Ts2, or monitoring symbols of a slot in the monitoring duration, and where the control channel monitoring frequency is a value obtained by either dividing the first monitoring duration in a periodicity by the first control channel monitoring periodicity or by dividing the second monitoring duration in a periodicity by the second control channel monitoring periodicity.

In the fourth implementation, the first control channel monitoring periodicity of the first type of parameters is different from the second control channel monitoring periodicity of the second type of parameters, the first monitoring duration is different from the second monitoring duration, and the control channel monitoring frequency for the first monitoring mode different from that of the second monitoring mode, and Ts1/Ks1>Ts2/Ks2, or Ks1<Ks2, or Ts1>Ts2.

In the fourth implementation, the first or second control channel monitoring periodicity is a number of slot that is greater than 0 slot, the starting position offset is less than the control channel monitoring periodicity, the first or second monitoring duration is the number of slot that is not less than 0 and not larger than the control channel monitoring periodicity, and a starting slot index of the first or second monitoring duration is associated with the first or second control channel monitoring periodicity, respectively, and the starting position offset.

In some embodiments, the first set of parameters, the second set of parameters, or the set of parameters are provided by search space information in a radio resource control (RRC) signaling or by medium access control-control element (MAC CE) or by layer 1 (L1) signaling. In some embodiments, the information includes: downlink control information (DCI) format information, or search space type information, or radio network temporary identifier (RNTI), or wake-up signal carrying instructions, or an identifier of the user equipment. In some embodiments, the information includes: a start time and a length of a time domain, or a number of physical resource blocks in a frequency domain, or a bandwidth part index (BWP ID), or a control resource set index (CORESET ID), or a carrier index (carrier ID), a subcarrier spacing (SCS), or a carrier aggregation level (AL), or a frequency range type (FR type), or a rank indication value (RI), or a number of antenna ports (port), or a precoding codebook index (PMI)

In some embodiments, the information includes a service type, or a power saving policy, or a power saving parameter of a power saving policy. In some embodiments, the information includes: a channel state information reference signal (CSI-RS), or a demodulation reference signal (DMRS), or a hybrid automatic repeat request acknowledgement signal (HARQ-ACK), or a synchronization reference signal (TRS), or a sounding reference signal (SRS). In some embodiments, the information includes: a radio resource control (RRC) layer control signaling or layer 3 signaling, or an intermediate access control layer control information or layer 2 signaling, or a downlink control information (DCI) or layer 1 signaling. In some embodiments, the information indicates control channel monitoring mode of the user equipment or a group of one or more user equipment, and the group of user equipment is grouped by a base station according to one or more parameters related to the group of user equipment.

In some embodiments, the one or more parameters include: a user equipment identifier (UE ID), a radio network temporary identification number (RNTI), a power saving RNTI, or a priority of a service type. In some embodiments, the the control channel is a physical downlink control channel (PDCCH).

Figure 14:
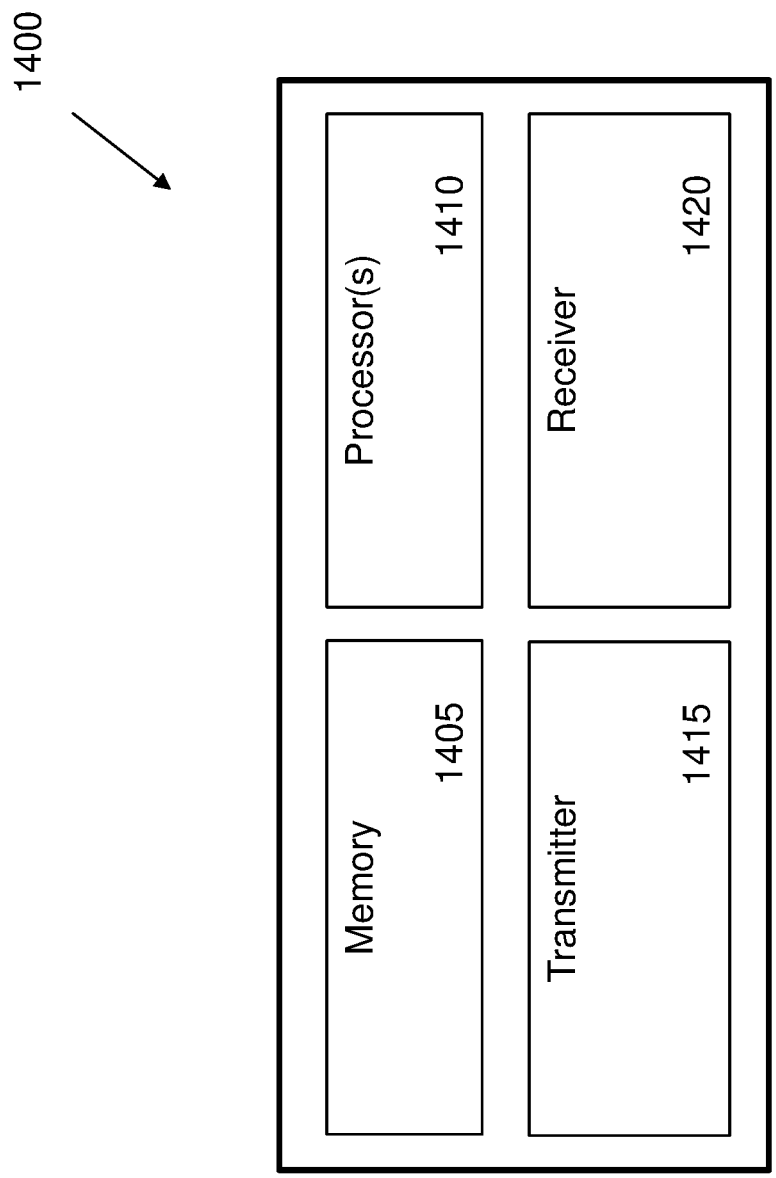
FIG. 14 shows an exemplary block diagram of a hardware platform that may be a part of a network node or a user equipment.

FIG. 14 shows an exemplary block diagram of a hardware platform 1400 that may be a part of a network node (e.g., base station) or a user equipment. The hardware platform 1400 includes at least one processor 1410 and a memory 1405 having instructions stored thereupon. The instructions upon execution by the processor 1410 configure the hardware platform 1400 to perform the operations described in FIGS. 1 to 13 and in the various embodiments described in this patent document. The transmitter 1415 transmits or sends information or data to another node. For example, a network node transmitter can send DCI to a user equipment. The receiver 1420 receives information or data transmitted or sent by another node. For example, a user equipment can receive DCI from a network node.

In this document, the use of "or" is intended to include "and/or", unless the context clearly indicates otherwise. In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
transmitting, by a user equipment to a base station, a feature list comprising a control channel monitoring mode supported by the user equipment, wherein the control channel monitoring mode supported by the user equipment comprises a first monitoring mode that skips control channel monitoring and a second monitoring mode that reduces a control channel monitoring frequency;
receiving, in response to the transmitting the feature list, information that indicates a monitoring mode for a control channel,
wherein the monitoring mode is the first monitoring mode that skips control channel monitoring or the second monitoring mode that reduces the control channel monitoring frequency, wherein a first set of parameters of the first monitoring mode include a duration for skipping control channel monitoring, and wherein a second set of parameters of the second monitoring mode include:
a control channel monitoring periodicity,
a starting position offset,
a monitoring duration in a periodicity, and
monitoring symbols of a slot in the monitoring duration; and monitoring, by the user equipment, the control channel according to the monitoring mode.

2. The method of claim 1, wherein the monitoring mode is one of the first monitoring mode that skips control channel monitoring and a third monitoring mode that does not support skipping control channel monitoring.

3. The method of claim 1, wherein the monitoring mode is one of a third monitoring mode that reduces a control channel monitoring frequency with a first type of parameters and the second monitoring mode that reduces the control channel monitoring frequency with a second type of parameters.

4. The method of claim 3,
wherein a first set of parameters of the first monitoring mode include:
a first control channel monitoring periodicity Ks1, and
a first monitoring duration in a periodicity Ts1, and
wherein a second set of parameters of the second monitoring mode include:
a second control channel monitoring periodicity Ks2, and
a second monitoring duration in a periodicity Ts2.

5. The method of claim 4,
wherein Ts1/Ks1>Ts2/Ks2, or Ks1<Ks2, or Ts1>Ts2.

6. The method of claim 1, wherein the information includes:
a radio resource control (RRC) layer control signaling, or
a downlink control information (DCI).

7. The method of claim 1, wherein the control channel is a physical downlink control channel (PDCCH).

8. A user equipment for wireless communication comprising at least one processor, wherein the at least one processor is configured to cause the user equipment to:
transmit, by the user equipment to a base station, a feature list comprising a control channel monitoring mode supported by the user equipment, wherein the control channel monitoring mode supported by the user equipment comprises a first monitoring mode that skips control channel monitoring and a second monitoring mode that reduces a control channel monitoring frequency;
receive, in response to the transmit the feature list, information that indicates a monitoring mode for a control channel,
wherein the monitoring mode is the first monitoring mode that skips control channel monitoring or the second monitoring mode that reduces the control channel monitoring frequency,
wherein a first set of parameters of the first monitoring mode include a duration for skipping control channel monitoring, and
wherein a second set of parameters of the second monitoring mode include:
a control channel monitoring periodicity,
a starting position offset,
a monitoring duration in a periodicity, and
monitoring symbols of a slot in the monitoring duration; and monitor, by the user equipment, the control channel according to the monitoring mode.

9. The user equipment of claim 8, wherein the monitoring mode is one of the first monitoring mode that skips control channel monitoring and a third monitoring mode that does not support skipping control channel monitoring.

10. The user equipment of claim 8, wherein the monitoring mode is one of a third monitoring mode that reduces a control channel monitoring frequency with a first type of parameters and the second monitoring mode that reduces the control channel monitoring frequency with a second type of parameters.

11. The user equipment of claim 10,
wherein a first set of parameters of the first monitoring mode include:
a first control channel monitoring periodicity Ks1, and
a first monitoring duration in a periodicity Ts1, and
wherein a second set of parameters of the second monitoring mode include:
a second control channel monitoring periodicity Ks2, and
a second monitoring duration in a periodicity Ts2.

12. The user equipment of claim 11,
wherein Ts1/Ks1>Ts2/Ks2, or Ks1<Ks2, or Ts1>Ts2.

13. The user equipment of claim 8, wherein the information includes:
a radio resource control (RRC) layer control signaling, or
a downlink control information (DCI).

14. The user equipment of claim 8, wherein the control channel is a physical downlink control channel (PDCCH).

15. A non-transitory computer readable program storage medium having code stored thereon, the code, when executed by at least one processor, causing the at least one processor to implement a method, comprising:
transmitting, by a user equipment to a base station, a feature list comprising a control channel monitoring mode supported by the user equipment, wherein the control channel monitoring mode supported by the user equipment comprises a first monitoring mode that skips control channel monitoring and a second monitoring mode that reduces a control channel monitoring frequency;
receiving, in response to the transmitting the feature list, information that indicates a monitoring mode for a control channel,
wherein the monitoring mode is the first monitoring mode that skips control channel monitoring or the second monitoring mode that reduces the control channel monitoring frequency,
wherein a first set of parameters of the first monitoring mode include a duration for skipping control channel monitoring, and
wherein a second set of parameters of the second monitoring mode include:
a control channel monitoring periodicity,
a starting position offset,
a monitoring duration in a periodicity, and
monitoring symbols of a slot in the monitoring duration; and
monitoring, by the user equipment, the control channel according to the monitoring mode.

16. The non-transitory computer readable program storage medium of claim 15, wherein the monitoring mode is one of the first monitoring mode that skips control channel monitoring and a third monitoring mode that does not support skipping control channel monitoring.

17. The non-transitory computer readable program storage medium of claim 15, wherein the monitoring mode is one of a third monitoring mode that reduces a control channel monitoring frequency with a first type of parameters and the second monitoring mode that reduces the control channel monitoring frequency with a second type of parameters.

18. The non-transitory computer readable program storage medium of claim 17,
   wherein a first set of parameters of the first monitoring mode include:
      a first control channel monitoring periodicity Ks1, and
      a first monitoring duration in a periodicity Ts1, and
   wherein a second set of parameters of the second monitoring mode include:
      a second control channel monitoring periodicity Ks2, and
      a second monitoring duration in a periodicity Ts2.

19. The non-transitory computer readable program storage medium of claim 18,
   wherein Ts1/Ks1>Ts2/Ks2, or Ks1<Ks2, or Ts1>Ts2.

20. The non-transitory computer readable program storage medium of claim 15,
   wherein the information includes:
      a radio resource control (RRC) layer control signaling, or
      a downlink control information (DCI).

* * * * *